(12) United States Patent
Chung et al.

(10) Patent No.: US 8,873,165 B1
(45) Date of Patent: Oct. 28, 2014

(54) OPTICAL LENS SYSTEM

(71) Applicant: Glory Science Co., Ltd., Changhua Hsien (TW)

(72) Inventors: Feng-Chao Chung, Changhua Hsien (TW); Shih-Yuan Chang, Changhua Hsien (TW); Kun-Ti Liu, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 14/135,305

(22) Filed: Dec. 19, 2013

(51) Int. Cl.
*G02B 3/02* (2006.01)
*G02B 13/18* (2006.01)

(52) U.S. Cl.
CPC .................................... *G02B 13/18* (2013.01)
USPC ........................................................ 359/714

(58) Field of Classification Search
USPC ........................................................ 359/714
See application file for complete search history.

(56) References Cited

U.S. PATENT DOCUMENTS

| | | | |
|---|---|---|---|
| 8,284,291 B2 | 10/2012 | Huang et al. | |
| 8,310,768 B2 | 11/2012 | Lin et al. | |
| 8,390,941 B2 | 3/2013 | Shinohara | |
| 8,395,851 B2 | 3/2013 | Tang et al. | |
| 8,456,757 B2 | 6/2013 | Tsai et al. | |
| 8,456,758 B1 | 6/2013 | Huang et al. | |
| 8,488,259 B2 | 7/2013 | Chen et al. | |
| 2012/0287513 A1* | 11/2012 | Hsu et al. ....................... | 359/714 |

* cited by examiner

*Primary Examiner* — James Jones
(74) *Attorney, Agent, or Firm* — Banger Shia

(57) ABSTRACT

An optical lens system having a small F number, a wide angle of view, a short total length and a low manufacturing cost, includes, in order from an object side to an image side: a stop; a first lens element with a positive refractive power; a meniscus second lens element with a negative refractive power; a third lens element with a positive refractive power; a fourth lens element with a positive refractive power; a fifth lens element with a negative refractive power, the optical lens system has a focal length of f, the first lens element has a focal length f1, the third lens element has a focal length f3, the fourth lens element has a focal length f4, the fifth lens element has a focal length f5, and they satisfy the conditions: $0.4 < f4/f < 1.0$; $-0.8 < f5/f < -0.4$; and $f1/f < 1.2 < f3/f$.

9 Claims, 14 Drawing Sheets

OPTICAL LENS SYSTEM

BACKGROUND OF THE INVENTION

1. Field of the Invention

The present invention relates to an optical lens system, and more particularly to a five-piece optical lens system applicable to electronic products.

2. Description of the Prior Art

With the consumer electronic industry continuously growing, the current market demand for small imaging lens system is also increasing. Especially for the imaging lens application in mobile phone, tablet computer and notebook, optical lens system has almost become mainstream in the market. Optical lens has been developed into multiple-piece lens system from the early two-piece lens system, in order to enhance resolution and image quality. Moreover, as electronic products are becoming thinner, lighter and easier to carry, the imaging lens system also needs to be further reduced in size in order to fit in the increasingly miniaturized carrier, meanwhile, it would be better to have a smaller F number, so that the imaging lens system is still able to take clear pictures even when the light is dim. For example, the optical lens systems disclosed in U.S. Pat. No. 8,310,768, 8,395,851 or 8,456,757 are all provided with multiple pieces of lens elements in order to improve resolution, however, their lengths are too long and F numbers are big. For another example, the optical lens systems disclosed in U.S. Pat. Nos. 8,284,291, 8,390,941 and 8,488,259 all have a smaller F number, but is provided with more than two lens elements which are made of high refractive material, and the use of high refractive material will increase the manufacturing cost. Yet, for another example, the optical lens system as disclosed in U.S. Pat. No. 8,456,758, only uses a single high refractive material piece and provides a smaller F number. However, the chief ray angle at the edge of the image is too large, which adversely affects the brightness and color at the peripheral of the image, namely, resulting in a poor image edge quality.

The present invention has been made in order to solve the above-mentioned problems.

SUMMARY OF THE INVENTION

The primary objective of the present invention is to provide an optical lens system applicable to electronic products which require the use of micro camera, such as mobile phone, notebook, and tablet computer, etc. The optical lens system of the present invention is compact and has a wide angle of view, a small F number with high image quality and low sensitivity to assembly tolerance, and a low material cost.

To achieve the above objective, an optical lens system in accordance with the present invention comprises, in order from an object side to an image side:

a stop;

a first lens element with a positive refractive power having an aspheric convex object-side surface and an aspheric convex image-side surface;

a second lens element with a negative refractive power having a meniscus shape, and a concave image-side surface, at least one of an object-side surface or the image-side surface of the second lens element being aspheric;

a third lens element with a positive refractive power having a convex object-side surface, and the image-side surface being convex or flat near the optical axis, both of the object-side surface and the image-side surface thereof being aspheric;

a fourth lens element with a positive refractive power having concave object-side surface and a convex image-side surface, at least one of the object-side surface or the image-side surface of the fourth lens element being aspheric;

a fifth lens element with a negative refractive power having an aspheric object-side surface and an aspheric image-side surface, the image-side surface being concave near the optical axis, and at least one inflection point being formed on the image-side surface of the fifth lens element;

a focal length of the optical lens system is f, a focal length of the first lens element is f1, a focal length of the third lens element is f3, a focal length of the fourth lens element is f4, a focal length of the fifth lens element is f5, and they satisfy the condition s:

$$0.4 < f4/f < 1.0;$$

$$-0.8 < f5/f < -0.4;$$

$$f1/f < 1.2 < f3/f.$$

When the condition $0.4<f4/f<1.0$ is satisfied, the distribution of the refractive power of the forth lens can be controlled, so that the total length of the optical lens system would be reduced to facilitate miniaturization of optical lens system. Besides, the sensitivity of the optical lens system assembly tolerance can also be reduced.

When the condition $-0.8<f5/f<-0.4$ is satisfied, the total length of the optical lens system can be further reduced, and the higher order aberrations caused by other lens elements of the optical lens system can be balanced, moreover, the back focal length can also be lengthened for placing other components, such as Infrared filter plate and sensor protection glass.

When the condition $f1/f<1.2<f3/f$ is satisfied, the refractive power of the optical lens system is mainly provided by the first lens element, thus the view angle of the optical lens system can be increased. Furthermore, the refractive power of the first and second lens elements can be appropriately distributed, and high order aberrations of the optical lens system can also be prevented from becoming too large, thus obtaining a relatively high image quality.

Preferably, a distance between the object-side surface and the image-side surface of the fifth lens element along an optical axis is D9, a distance between the object-side surface and the image-side surface of the fourth lens element along the optical axis is D7, the focal length of the optical lens system is f, and they satisfy the condition:

$$0.1 < (D9-D7) \times 10/f < 1.0,$$

When the above condition is satisfied, the length of the optical lens system can be effectively reduced and a smaller distortion can be maintained.

Preferably, a radius of curvature of the object-side surface of the fourth lens element is R7, a radius of curvature of the image-side surface of the fourth lens element is R8, and they satisfy the condition:

$$0.2 < (R7-R8)/(R7+R8) < 0.7,$$

When the above condition is satisfied, the field curvature and astigmatism of the optical lens system can have a better correction. Moreover, the lens elements can be ensured to have an easy-to-make shape, so as to reduce manufacturing difficulties, thereby reducing the manufacture cost.

Preferably, a radius of curvature of the object-side surface of the fifth lens element is R9, the focal length of the optical lens system is f, and they satisfy the condition:

$$|R9|/f > 4,$$

When the above condition is satisfied, the field curvature and spherical aberration of the optical lens system can be effectively corrected.

Preferably, a focal length of the second lens element is f2, the focal length of the optical lens system is f, and they satisfy the condition:

$-1.4 < f2/f < -0.85$,

When the above condition is satisfied, the refractive power of the second lens element is proper, so that even the optical lens system has small F number, the assembly sensitivity of the second lens element won't increase. Besides, the aberrations generated by the first positive lens element can also be appropriately corrected.

Preferably, a refraction index of the second lens element is Nd2, and an Abbe number of the second lens element is Vd2, and they satisfy the condition:

$Nd2 > 1.57$ and $Vd2 < 28$,

When the above condition is satisfied, the chromatic aberration of the optical lens system can be corrected.

Preferably, a refraction index of the third lens element is Nd3, and an Abbe number of the third lens element is Vd3, and they satisfy the condition:

$Nd3 < 1.6$ and $Vd3 > 30$,

When the above condition is satisfied, the third lens element can be made of a plastic material with low dispersion and refractive power, so that the cost of the optical lens system can be reduced, while a good image quality can still be maintained.

Preferably, a distance from the object-side surface of the first lens element to the image plane along the optical axis is TL, a half of the maximum image height of the present optical lens system is ImgH, and they satisfy the condition:

$TL/ImgH < 1.7$,

When the above condition is satisfied, the optical lens system can maintain a compact form, so that it can be installed in compact electronic product.

Preferably, a maximum angle of field of view of the optical lens system is FOV, and it satisfies the condition:

$FOV > 73$ degrees,

Therefore, the optical lens system can catch a wider range of object.

DETAILED DESCRIPTION OF THE PREFERRED EMBODIMENTS

Figure 1A:
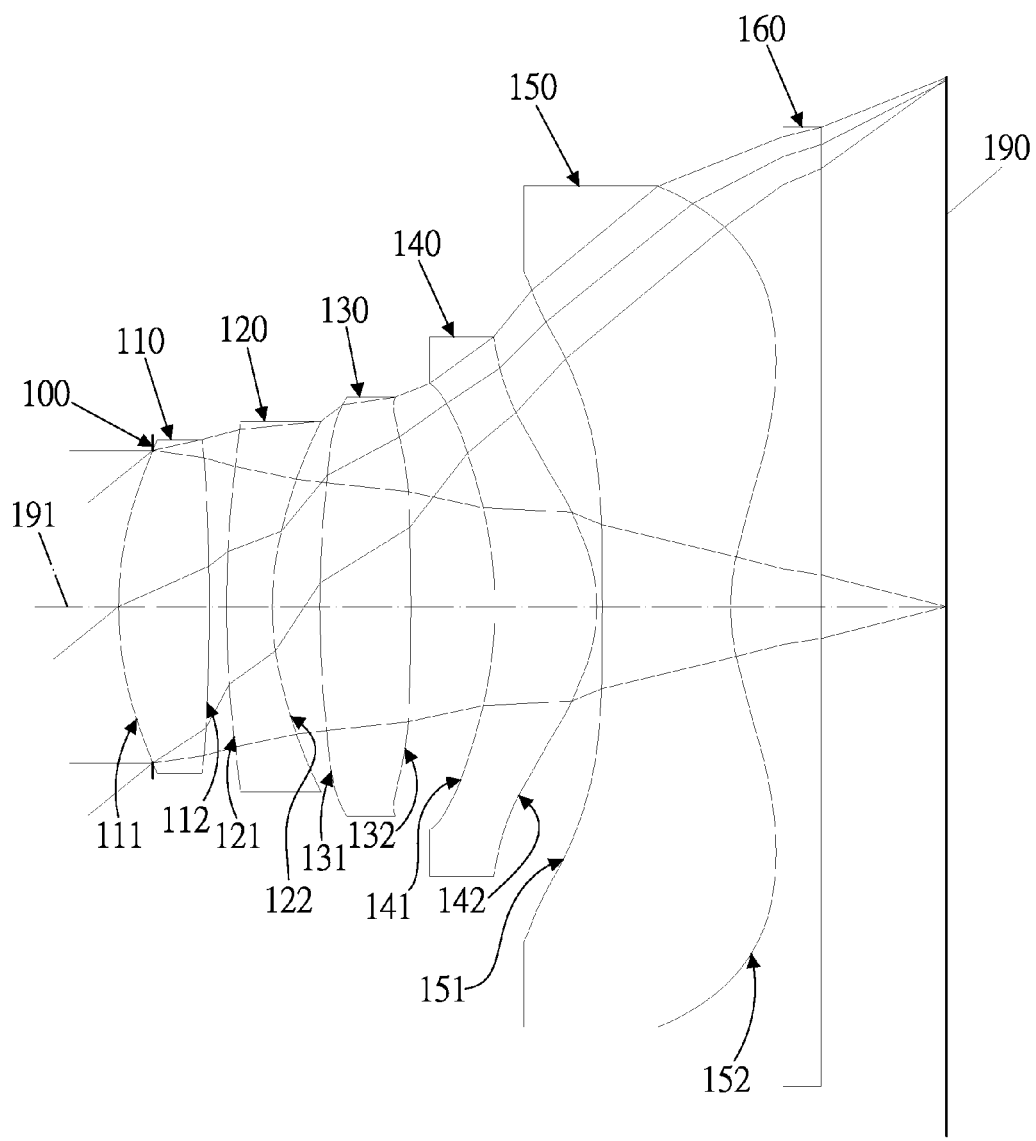
FIG. 1A shows an optical lens system in accordance with a first embodiment of the present invention.
Figure 1B:
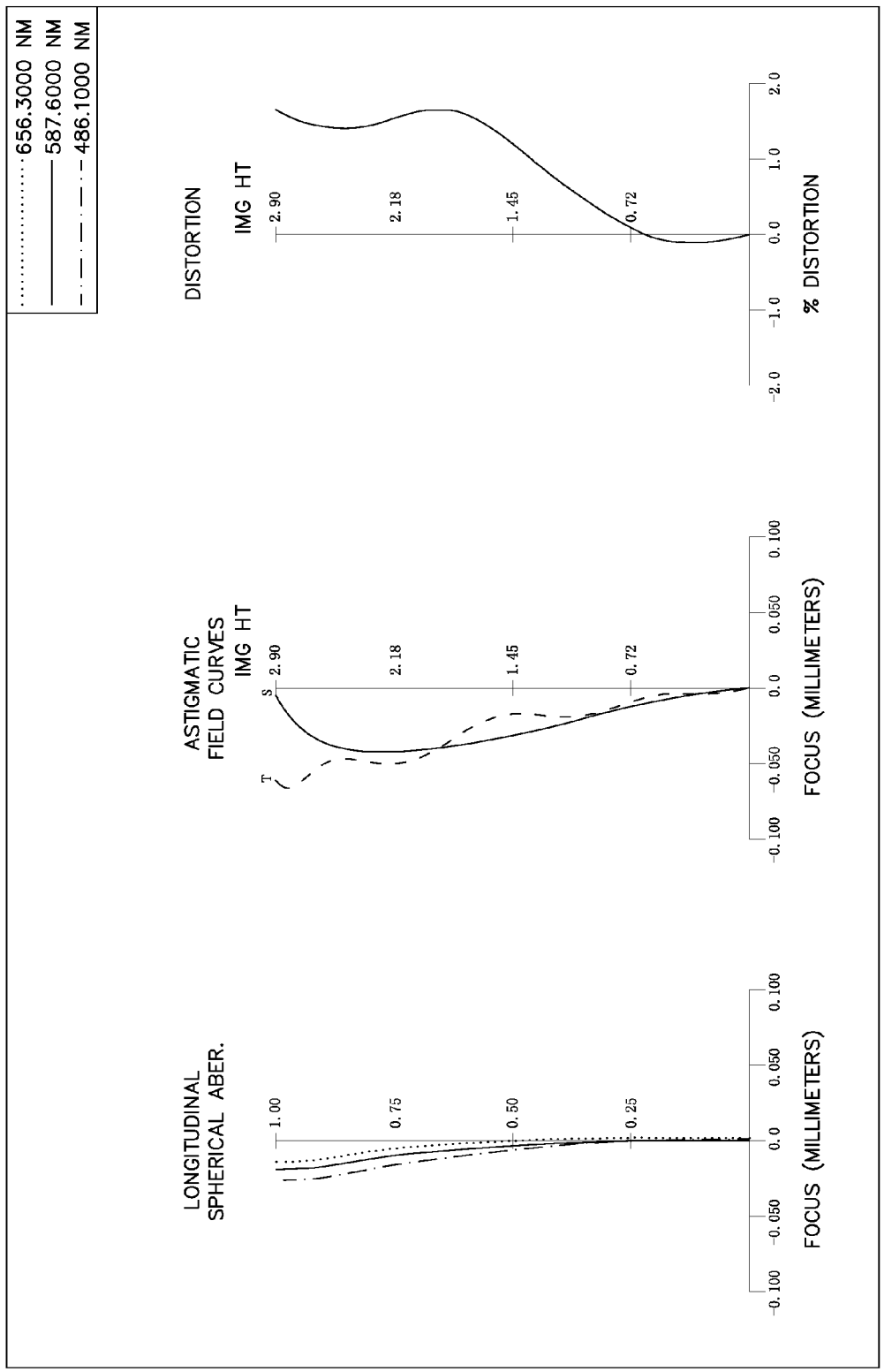
FIG. 1B shows the longitudinal spherical aberration curve, the astigmatic field curves and the distortion curve of the first embodiment of the present invention.

Referring to FIG. 1A, which shows an optical lens system in accordance with a first embodiment of the present invention, and FIG. 1B shows the longitudinal spherical aberration curves, the astigmatic field curves, and the distortion curve of the first embodiment of the present invention. An optical lens system in accordance with the first embodiment of the present invention comprises, in order from the object side to the image side:

A stop 100.

A first lens element 110 with a positive refractive power made of plastic has a convex object-side surface 111 and a convex image-side surface 112, and the object-side surface 111 and the image-side surface 112 of the first lens element 110 are aspheric.

A second lens element 120 with a negative refractive power made of plastic has an aspheric convex object-side surface 121, and an aspheric concave image-side surface 122.

A third lens element 130 with a positive refractive power made of plastic has an aspheric convex object-side surface 131, and an aspheric convex image-side surface 132.

A fourth lens element 140 with a positive refractive power made of plastic has aspheric concave object-side surface 141, and an aspheric convex image-side surface 142.

A fifth lens element 150 with a negative refractive power made of plastic has a concave object-side surface 151 and an image-side surface 152, and the image-side surface 152 is concave near the optical axis, both of the object-side surface 151 and the image-side surface 152 are aspheric, and at least one inflection point is formed on the image-side surface 152.

An IR filter 160 made of glass is located between the image-side surface 152 of the fifth lens element 150 and an image plane 190 and has no influence on the focal length of the optical lens system.

The equation for the aspheric surface profiles of the first embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_g, A_{10}, A_{12}, A_{14}$ . . . : represent the high-order aspheric coefficients.

In the first embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.54 (mm); Fno=2.05, HFOV=39 degrees, and FOV=78 degrees.

In the first embodiment of the present optical lens system, the focal length of the optical lens system is f, a focal length of the fourth lens element 140 is f4, and they satisfy the condition: f4/f=0.62.

In the first embodiment of the present optical lens system, the focal length of the optical lens system is f, a focal length of the fifth lens element 150 is f5, and they satisfy the condition: f5/f=−0.53.

In the first embodiment of the present optical lens system, a focal length of the first lens element 110 is f1, the focal length of the optical lens system is f, and they satisfy the condition: f1/f=0.82.

In the first embodiment of the present optical lens system, a focal length of the third lens element 130 is f3, the focal length of the optical lens system is f, and they satisfy the condition: f3/f=1.93.

In the first embodiment of the present optical lens system, a distance between the object-side surface 151 and the image-side surface 152 of the fifth lens element 150 along an optical axis 191 is D9, a distance between the object-side surface 141 and the image-side surface 142 of the fourth lens element 140 along the optical axis 191 is D7, the focal length of the optical lens system is f, and they satisfy the condition: (D9−D7)×10/f=0.41.

In the first embodiment of the present optical lens system, a radius of curvature of the object-side surface 141 of the fourth lens element 140 is R7, a radius of curvature of the image-side surface 142 of the fourth lens element 140 is R8, and they satisfy the condition: (R7−R8)/(R7+R8)=0.45.

In the first embodiment of the present optical lens system, a radius of curvature of the object-side surface 151 of the fifth lens element 150 is R9, the focal length of the optical lens system is f, and they satisfy the condition: |R9|/f=11.30.

In the first embodiment of the present optical lens system, a focal length of the second lens element 120 is f2, the focal length of the optical lens system is f, and they satisfy the condition: f2/f=−1.09.

In the first embodiment of the present optical lens system, a refraction index of the second lens element 120 is Nd2, and an Abbe number of the second lens element 120 is Vd2, and they satisfy the conditions: Nd2=1.632; Vd2=23.40.

In the first embodiment of the present optical lens system, a refraction index of the third lens element 130 is Nd3, and an Abbe number of the third lens element 130 is Vd3, and they satisfy the conditions: Nd3=1.544; Vd3=55.90.

In the first embodiment of the present optical lens system, a distance from the object-side surface 111 of the first lens element 110 to the image plane 190 along the optical axis 191 is TL, and a half of the maximum image height of the present optical lens system is ImgH, and they satisfy the condition: TL/ImgH=1.58.

The detailed optical data of the first embodiment is shown in table 1, and the aspheric surface data is shown in table 2, wherein the units of the radius of curvature, the thickness and the focal length in table 1 are expressed in mm, and in table 2, k represents the conic constant, and $A_4, A_6, A_g, A_{10}, A_{12}, A_{14}$ . . . : represent the high-order aspheric coefficients. In the tables 1 and 2, the surfaces 1 and 2 represent the object-side surface 111 and the image-side surface 112 of the first lens element 110, respectively, the surfaces 3 and 4 represent the object-side surface 121 and the image-side surface 122 of the second lens element 120, respectively, the surfaces 5 and 6 represent the object-side surface 131 and the image-side surface 132 of the third lens element 130, respectively, the surfaces 7 and 8 represent the object-side surface 141 and the image-side surface 142 of the fourth lens element 140, respectively, and the surfaces 9 and 10 represent the object-side surface 151 and the image side surface 152 of the fifth lens element 150, respectively.

TABLE 1

(Embodiment 1)
f(focal length) = 3.54 mm, Fno = 2.05, HFOV = 39 deg.

| Surface # | | Curvature Radius | Thickness | Material | index | Abbe | Focal length |
|---|---|---|---|---|---|---|---|
| 0 | Object | Infinity | Infinity | | | | |
| 1 (stop) | Lens 1 | 1.95 (ASP) | 0.50 | Plastic | 1.544 | 55.9 | 2.91 |
| 2 | | −7.71 (ASP) | 0.09 | | | | |
| 3 | Lens 2 | 5.37 (ASP) | 0.25 | Plastic | 1.632 | 23.4 | −3.85 |
| 4 | | 1.64 (ASP) | 0.26 | | | | |
| 5 | Lens 3 | 4.42 (ASP) | 0.50 | Plastic | 1.544 | 55.9 | 6.81 |
| 6 | | −22.05 (ASP) | 0.46 | | | | |
| 7 | Lens 4 | −2.20 (ASP) | 0.56 | Plastic | 1.535 | 55.5 | 2.19 |
| 8 | | −0.83 (ASP) | 0.03 | | | | |
| 9 | Lens 5 | −40.00 (ASP) | 0.71 | Plastic | 1.535 | 55.5 | −1.88 |
| 10 | | 1.04 (ASP) | 0.29 | | | | |
| 11 | IR-filter | Infinity | 0.21 | Glass | 1.517 | 64.2 | — |
| 12 | | Infinity | 0.69 | | | | |
| 13 | Image | Infinity | — | | | | |

TABLE 2

Aspheric Coefficients

| Surface # | 1 | 2 | 3 | 4 | 5 |
|---|---|---|---|---|---|
| k = | −3.14E+00 | −4.00E+00 | −1.19E+01 | −7.30E+00 | 6.89E+00 |
| A4 = | 3.85E−02 | 5.39E−02 | −4.18E−02 | 2.32E−02 | −8.06E−02 |
| A6 = | 1.23E−02 | −3.93E−02 | 1.10E−01 | 6.40E−02 | 1.78E−02 |
| A8 = | −6.28E−02 | −1.35E−02 | −1.04E−01 | −6.00E−02 | −3.33E−02 |
| A10 = | 6.21E−02 | −4.49E−03 | −3.17E−02 | −1.25E−03 | 5.14E−02 |
| A12 = | −3.16E−02 | 1.65E−03 | 5.81E−02 | 1.58E−02 | 1.06E−02 |
| A14 = | 2.47E−03 | 4.12E−03 | −3.87E−03 | −2.65E−04 | −1.33E−02 |
| A16 = | | | | | |
| A18 = | | | | | |

| Surface # | 6 | 7 | 8 | 9 | 10 |
|---|---|---|---|---|---|
| k = | −4.00E+01 | 2.09E+00 | −3.27E+00 | 4.93E+01 | −7.46E+00 |
| A4 | −3.66E−02 | 5.01E−02 | −8.99E−02 | −5.79E−02 | −6.99E−02 |
| A6 | −1.16E−02 | 4.26E−02 | 8.46E−02 | −6.50E−03 | 2.60E−02 |
| A8 | −2.28E−02 | −2.05E−02 | −1.17E−02 | 7.20E−03 | −8.62E−03 |
| A10 | −1.20E−02 | −1.51E−02 | −6.23E−04 | 3.69E−04 | 1.51E−03 |
| A12 | 2.64E−02 | 3.37E−03 | 2.53E−04 | −1.19E−03 | −7.64E−05 |
| A14 | 1.06E−03 | −3.34E−03 | −3.44E−04 | 5.18E−05 | −2.66E−05 |
| A16 = | | 3.43E−03 | −8.79E−05 | 1.51E−04 | 5.79E−06 |
| A18 = | | | 4.89E−05 | −2.83E−05 | −4.00E−07 |

Figure 2A:
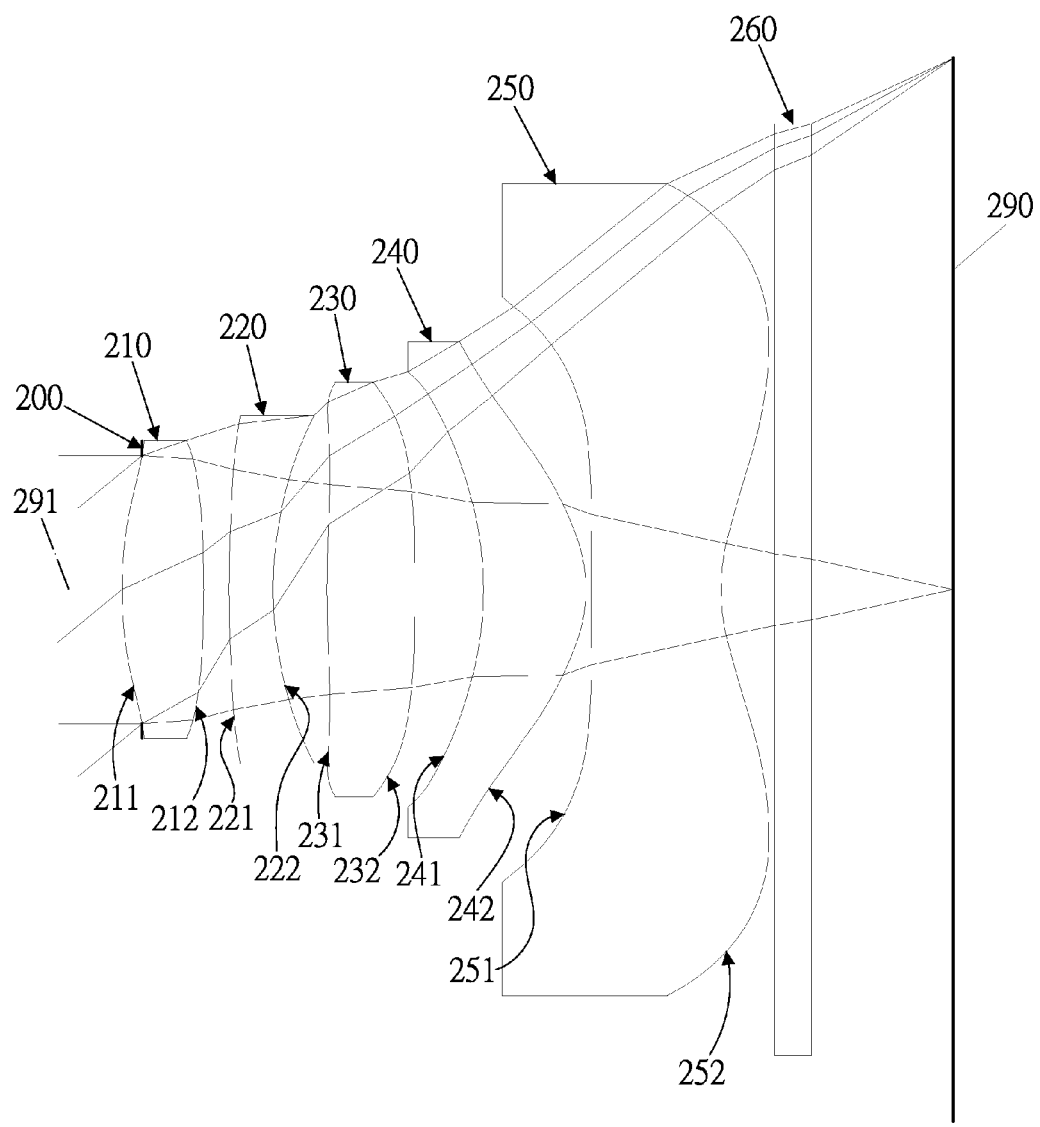
FIG. 2A shows an optical lens system in accordance with a second embodiment of the present invention.
Figure 2B:
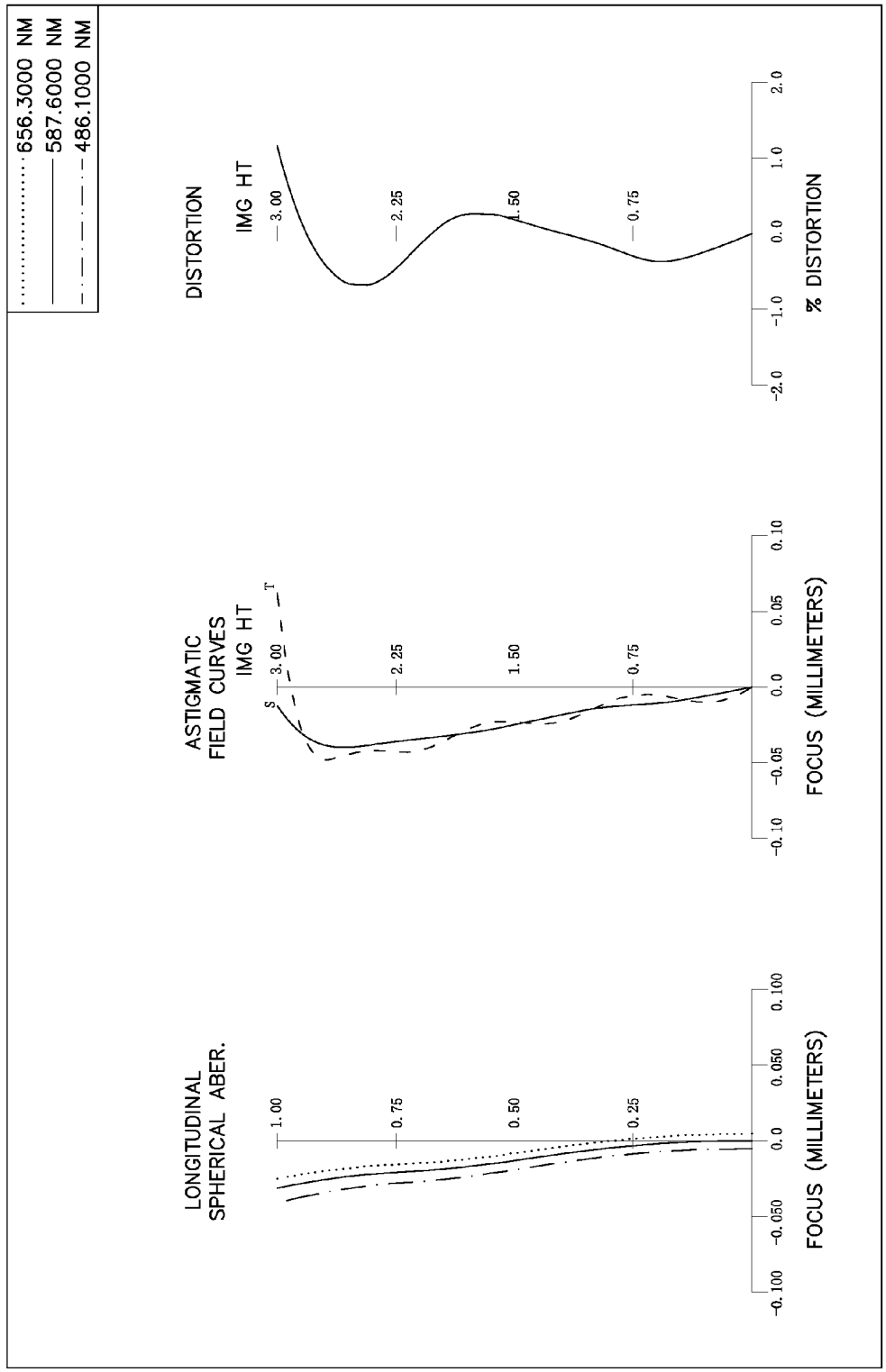
FIG. 2B shows the longitudinal spherical aberration curve, the astigmatic field curves and the distortion curve of the second embodiment of the present invention.

Referring to FIG. 2A, which shows an optical lens system in accordance with a second embodiment of the present invention, and FIG. 2B shows the longitudinal spherical aberration curves, the astigmatic field curves, and the distortion curve of the second embodiment of the present invention. An optical lens system in accordance with the second embodiment of the present invention comprises, in order from the object side to the image side:

A stop 200.

A first lens element 210 with a positive refractive power made of plastic has a convex object-side surface 211 and a convex image-side surface 212, and the object-side surface 211 and the image-side surface 212 of the first lens element 210 are aspheric.

A second lens element 220 with a negative refractive power made of plastic has an aspheric convex object-side surface 221, and an aspheric concave image-side surface 222.

A third lens element 230 with a positive refractive power made of plastic has an aspheric convex object-side surface 231, and an aspheric convex image-side surface 232.

A fourth lens element 240 with a positive refractive power made of plastic has aspheric concave object-side surface 241, and an aspheric convex image-side surface 242.

A fifth lens element 250 has a negative refractive power made of plastic, the object-side surface 251 is convex near the optical axis and an image-side surface 252, and the image-side surface 252 is concave near the optical axis, both of the object-side surface 251 and the image-side surface 252 are aspheric, and at least one inflection point is formed on each of the image-side surface 252 and the object-side surface 251.

An IR filter 260 made of glass is located between the image-side surface 252 of the fifth lens element 250 and an image plane 290 and has no influence on the focal length of the optical lens system.

The equation for the aspheric surface profiles of the second embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the second embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.63 (mm); Fno=2.4, HFOV=39.4 degrees, and FOV=78.8 degrees.

In the second embodiment of the present optical lens system, the focal length of the optical lens system is f, a focal length of the fourth lens element 240 is f4, and they satisfy the condition: f4/f=0.61.

In the second embodiment of the present optical lens system, the focal length of the optical lens system is f, a focal length of the fifth lens element 250 is f5, and they satisfy the condition: f5/f=−0.54.

In the second embodiment of the present optical lens system, a focal length of the first lens element 210 is f1, the focal length of the optical lens system is f, and they satisfy the condition: f1/f=0.85.

In the second embodiment of the present optical lens system, a focal length of the third lens element 230 is f3, the focal length of the optical lens system is f, and they satisfy the condition: f3/f=2.41.

In the second embodiment of the present optical lens system, a distance between the object-side surface 251 and the image-side surface 252 of the fifth lens element 250 along an optical axis 291 is D9, a distance between the object-side surface 241 and the image-side surface 242 of the fourth lens element 240 along the optical axis 291 is D7, the focal length of the optical lens system is f, and they satisfy the condition: (D9−D7)×10/f=0.43.

In the second embodiment of the present optical lens system, a radius of curvature of the object-side surface 241 of the fourth lens element 240 is R7, a radius of curvature of the image-side surface 242 of the fourth lens element 240 is R8, and they satisfy the condition: (R7−R8)/(R7+R8)=0.39.

In the second embodiment of the present optical lens system, a radius of curvature of the object-side surface 251 of the fifth lens element 250 is R9, the focal length of the optical lens system is f, and they satisfy the condition: |R9|/f=4.32.

In the second embodiment of the present optical lens system, a focal length of the second lens element 220 is f2, the focal length of the optical lens system is f, and they satisfy the condition: f2/f=−1.27.

In the second embodiment of the present optical lens system, a refraction index of the second lens element 220 is Nd2, and an Abbe number of the second lens element 220 is Vd2, and they satisfy the relations: Nd2=1.632; Vd2=23.40.

In the second embodiment of the present optical lens system, a refraction index of the third lens element 230 is Nd3, and an Abbe number of the third lens element 230 is Vd3, and they satisfy the conditions: Nd3=1.515; Vd3=57.20.

In the second embodiment of the present optical lens system, a distance from the object-side surface 211 of the first lens element 210 to the image plane 290 along the optical axis 291 is TL, and a half of the maximum image height of the present optical lens system is ImgH, and they satisfy the condition: TL/ImgH=1.57.

The detailed optical data of the second embodiment is shown in table 3, and the aspheric surface data is shown in table 4, wherein the units of the radius of curvature, the thickness and the focal length in table 3 are expressed in mm, and in table 4, k represents the conic constant, and $A_4$, $A_6$, $A_8$, $A_{10}$, $A_{12}$, $A_{14}$ . . . : represent the high-order aspheric coefficients. In the tables 3 and 4, the surfaces 1 and 2 represent the object-side surface 211 and the image-side surface 212 of the first lens element 210, respectively, the surfaces 3 and 4 represent the object-side surface 221 and the image-side surface 222 of the second lens element 220, respectively, the surfaces 5 and 6 represent the object-side surface 231 and the image-side surface 232 of the third lens element 230, respectively, the surfaces 7 and 8 represent the object-side surface 241 and the image-side surface 242 of the fourth lens element 240, respectively, and the surfaces 9 and 10 represent the object-side surface 251 and the image-side surface 252 of the fifth lens element 250, respectively.

TABLE 3

(Embodiment 2)
f(focal length) = 3.63 mm, Fno = 2.4, HFOV = 39.4 deg.

| Surface # | | Curvature Radius | Thickness | Material | index | Abbe | Focal length |
|---|---|---|---|---|---|---|---|
| 0 | Object | Infinity | Infinity | | | | |
| 1 | Lens 1 | 2.15 (ASP) | 0.46 | Plastic | 1.535 | 55.5 | 3.09 |
| (stop) | | | | | | | |
| 2 | | −6.65 (ASP) | 0.14 | | | | |
| 3 | Lens 2 | 6.20 (ASP) | 0.25 | Plastic | 1.632 | 23.4 | −4.61 |
| 4 | | 1.95 (ASP) | 0.31 | | | | |
| 5 | Lens 3 | 6.24 (ASP) | 0.49 | Plastic | 1.515 | 57.2 | 8.76 |
| 6 | | −15.74 (ASP) | 0.39 | | | | |
| 7 | Lens 4 | −1.85 (ASP) | 0.58 | Plastic | 1.544 | 55.9 | 2.22 |
| 8 | | −0.81 (ASP) | 0.03 | | | | |
| 9 | Lens 5 | 15.67 (ASP) | 0.73 | Plastic | 1.535 | 55.5 | −1.95 |
| 10 | | 0.96 (ASP) | 0.30 | | | | |
| 11 | IR-filter | Infinity | 0.21 | Glass | 1.517 | 64.2 | — |
| 12 | | Infinity | 0.80 | | | | |
| 13 | Image | Infinity | — | | | | |

TABLE 4

Aspheric Coefficients

| Surface # | 1 | 2 | 3 | 4 | 5 |
|---|---|---|---|---|---|
| k = | −4.17E+00 | 3.00E+00 | 1.65E+01 | −1.09E+01 | −2.56E+00 |
| A4 = | 1.79E−02 | −2.16E−02 | −1.00E−01 | 4.05E−02 | −1.03E−01 |
| A6 = | −3.38E−02 | −3.47E−02 | 1.48E−01 | 4.24E−02 | 3.29E−02 |
| A8 = | −8.90E−02 | −1.70E−02 | −1.41E−01 | −4.64E−02 | −5.21E−02 |
| A10 = | 7.02E−02 | −5.21E−02 | 3.93E−03 | 3.04E−02 | 3.65E−02 |
| A12 = | −7.47E−02 | 1.74E−02 | 1.29E−01 | 4.78E−03 | 1.45E−02 |
| A14 = | −7.79E−03 | 1.51E−02 | −6.62E−02 | −6.23E−03 | −4.72E−03 |
| A16 = | | | | | |
| A18 = | | | | | |

| Surface # | 6 | 7 | 8 | 9 | 10 |
|---|---|---|---|---|---|
| k = | 2.57E+01 | 1.08E+00 | −2.92E+00 | −3.00E+01 | −6.53E+00 |
| A4 = | −7.35E−02 | 3.55E−02 | −1.17E−01 | −9.42E−02 | −7.71E−02 |
| A6 = | 2.38E−02 | 7.07E−02 | 8.95E−02 | 2.09E−02 | 2.94E−02 |
| A8 = | −4.87E−02 | −1.82E−02 | −1.94E−02 | −6.27E−03 | −9.05E−03 |
| A10 = | −1.54E−02 | −2.65E−02 | −8.53E−04 | −6.03E−04 | 1.37E−03 |
| A12 = | 3.12E−02 | 8.74E−03 | 9.29E−04 | 3.09E−04 | −8.75E−05 |
| A14 = | −8.02E−03 | 9.14E−03 | −8.93E−05 | | |
| A16 = | | −3.20E−03 | | | |

Figure 3A:
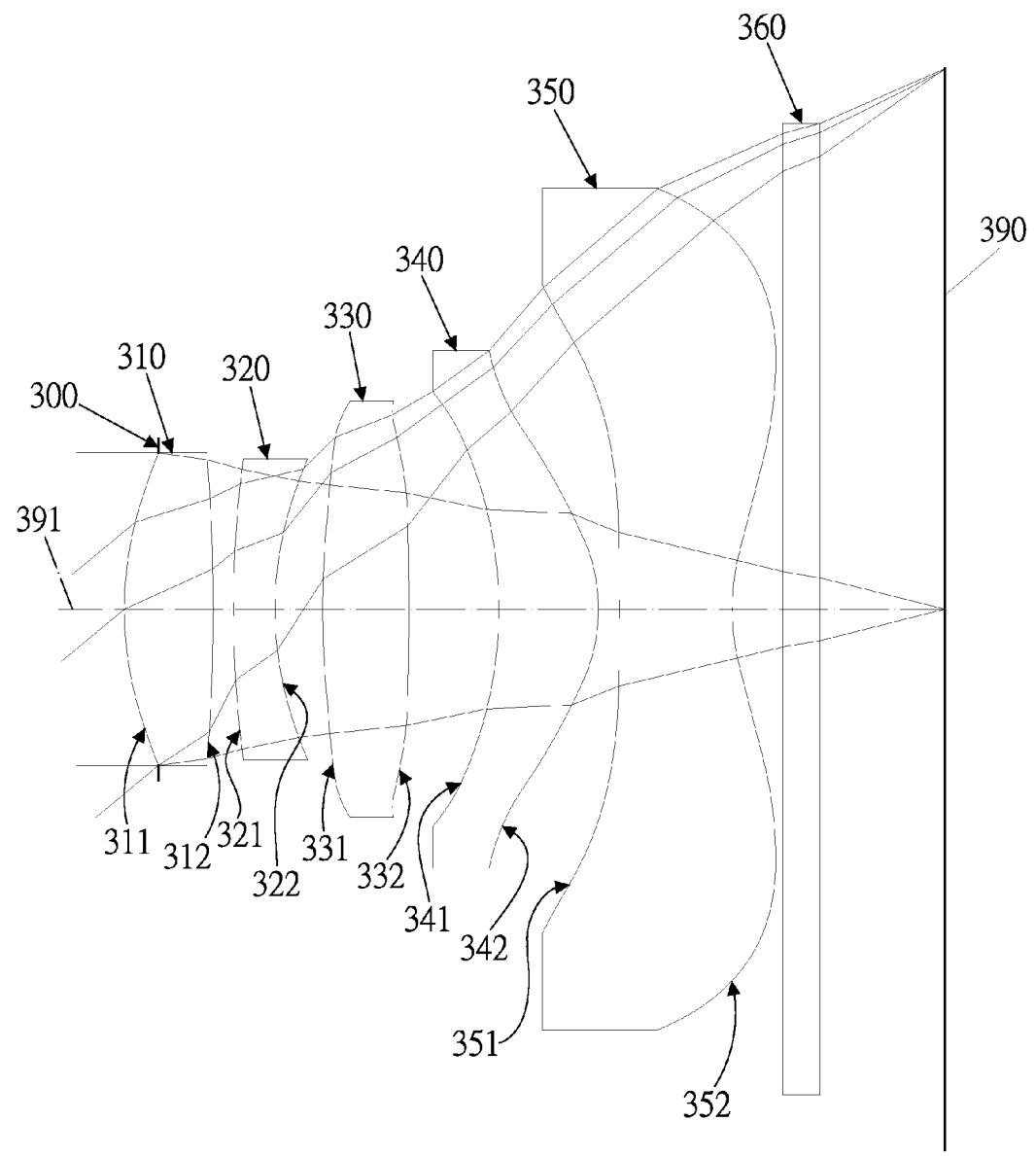
FIG. 3A shows an optical lens system in accordance with a third embodiment of the present invention.
Figure 3B:
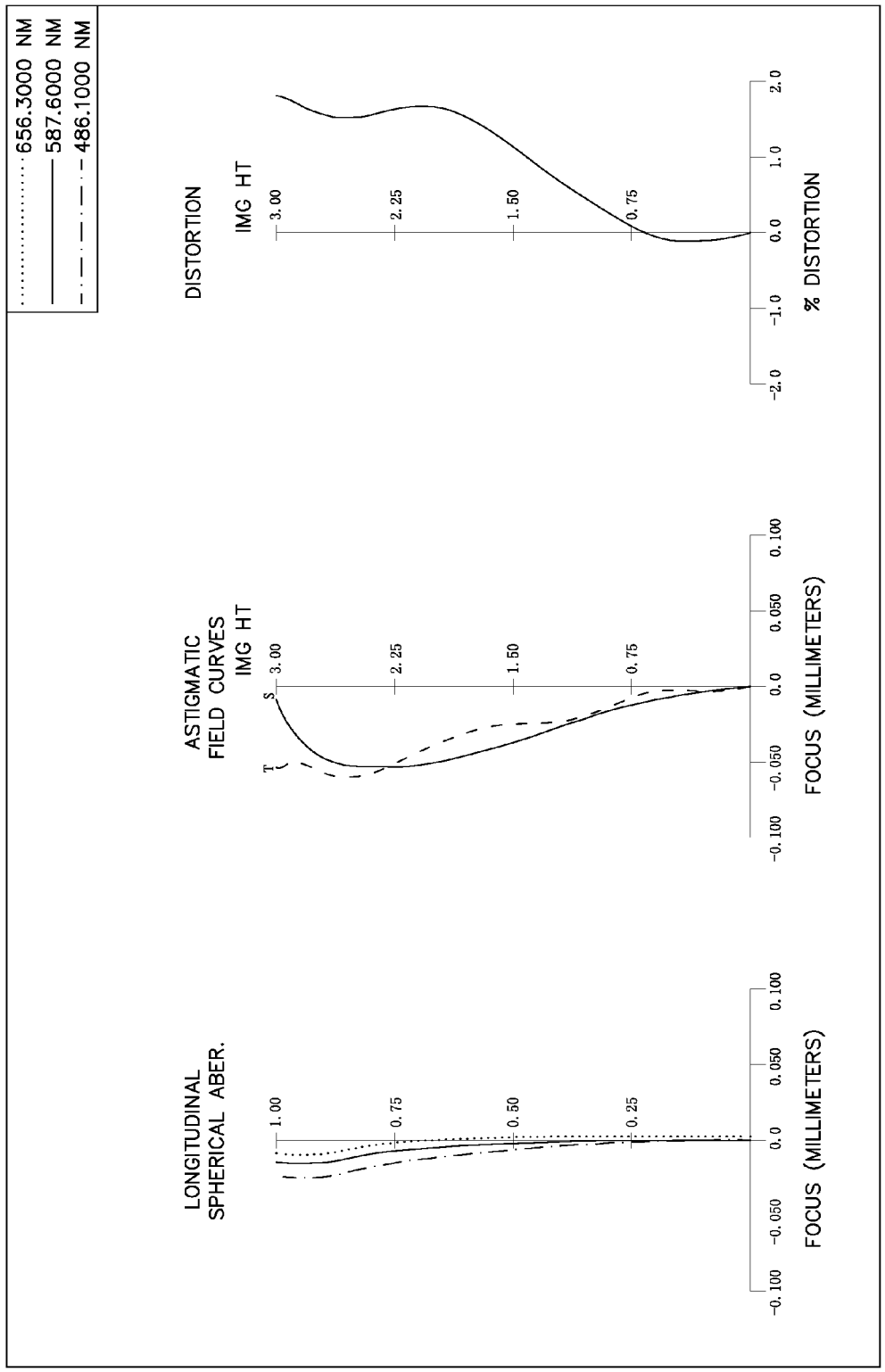
FIG. 3B shows the longitudinal spherical aberration curve, the astigmatic field curves and the distortion curve of the third embodiment of the present invention.

Referring to FIG. 3A, which shows an optical lens system in accordance with a third embodiment of the present invention, and FIG. 3B shows the longitudinal spherical aberration curves, the astigmatic field curves, and the distortion curve of the third embodiment of the present invention. An optical lens system in accordance with the third embodiment of the present invention comprises, in order from the object side to the image side:

A stop 300.

A first lens element 310 with a positive refractive power made of plastic has a convex object-side surface 311 and a convex image-side surface 312, and the object-side surface 311 and the image-side surface 312 of the first lens element 310 are aspheric.

A second lens element 320 with a negative refractive power made of plastic has an aspheric convex object-side surface 321, and an aspheric concave image-side surface 322.

A third lens element 330 with a positive refractive power made of plastic has an aspheric convex object-side surface 331, and an aspheric convex image-side surface 332.

A fourth lens element 340 with a positive refractive power made of plastic has aspheric concave object-side surface 341, and an aspheric convex image-side surface 342.

A fifth lens element 350 with a negative refractive power made of plastic has concave object-side surface 351 and an image-side surface 352, and the image-side surface 352 is concave near the optical axis, both of the object-side surface 351 and the image-side surface 352 are aspheric, and at least one inflection point is formed on the image-side surface 352.

An IR filter 360 made of glass is located between the image-side surface 352 of the fifth lens element 350 and an image plane 390 and has no influence on the focal length of the optical lens system.

The equation for the aspheric surface profiles of the third embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14}$ . . . : represent the high-order aspheric coefficients.

In the third embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the relations: f=3.56 (mm); Fno=2.05, HFOV=39.6 degrees, and FOV=79.2 degrees.

In the third embodiment of the present optical lens system, the focal length of the optical lens system is f, a focal length of the fourth lens element 340 is f4, and they satisfy the condition: f4/f=0.65.

In the third embodiment of the present optical lens system, the focal length of the optical lens system is f, a focal length of the fifth lens element 350 is f5, and they satisfy the condition: f5/f=−0.55.

In the third embodiment of the present optical lens system, a focal length of the first lens element 310 is f1, the focal length of the optical lens system is f, and they satisfy the condition: f1/f=0.82.

In the third embodiment of the present optical lens system, a focal length of the third lens element 330 is f3, the focal length of the optical lens system is f, and they satisfy the condition: f3/f=1.91.

In the third embodiment of the present optical lens system, a distance between the object-side surface 351 and the image-side surface 352 of the fifth lens element 350 along an optical axis 391 is D9, a distance between the object-side surface 341 and the image-side surface 342 of the fourth lens element 340 along the optical axis 391 is D7, the focal length of the optical lens system is f, and they satisfy the condition: (D9−D7)×10/f=0.20.

In the third embodiment of the present optical lens system, a radius of curvature of the object-side surface 341 of the fourth lens element 340 is R7, a radius of curvature of the image-side surface 342 of the fourth lens element 340 is R8, and they satisfy the condition: (R7−R8)/(R7+R8)=0.43.

In the third embodiment of the present optical lens system, a radius of curvature of the object-side surface 351 of the fifth lens element 350 is R9, the focal length of the optical lens system is f, and they satisfy the condition: |R9|/f=11.24.

In the third embodiment of the present optical lens system, a focal length of the second lens element 320 is f2, the focal length of the optical lens system is f, and they satisfy the condition: f2/f=−1.08.

In the third embodiment of the present optical lens system, a refraction index of the second lens element 320 is Nd2, and an Abbe number of the second lens element 320 is Vd2, and they satisfy the conditions: Nd2=1.632; Vd2=23.40.

In the third embodiment of the present optical lens system, a refraction index of the third lens element 330 is Nd3, and an Abbe number of the third lens element 330 is Vd3, and they satisfy the conditions: Nd3=1.544; Vd3=55.90.

In the third embodiment of the present optical lens system, a distance from the object-side surface 311 of the first lens element 310 to the image plane 390 along the optical axis 391 is TL, and a half of the maximum image height of the present optical lens system is ImgH, and they satisfy the condition: TL/ImgH=1.52.

The detailed optical data of the third embodiment is shown in table 5, and the aspheric surface data is shown in table 6, wherein the units of the radius of curvature, the thickness and the focal length in table 5 are expressed in mm, and in table 6, k represents the conic constant, and $A_4$, $A_6$, $A_8$, $A_{10}$, $A_{12}$, $A_{14}$ . . . : represent the high-order aspheric coefficients. In the tables 5 and 6, the surfaces 1 and 2 represent the object-side surface 311 and the image-side surface 312 of the first lens element 310, respectively, the surfaces 3 and 4 represent the object-side surface 321 and the image-side surface 322 of the second lens element 320, respectively, the surfaces 5 and 6 represent the object-side surface 331 and the image-side surface 332 of the third lens element 330, respectively, the surfaces 7 and 8 represent the object-side surface 341 and the image-side surface 342 of the fourth lens element 340, respectively, and the surfaces 9 and 10 represent the object-side surface 351 and the image-side surface 352 of the fifth lens element 350, respectively.

TABLE 5

(Embodiment 3)
f (focal length) = 3.56 mm, Fno = 2.05, HFOV = 39.6 deg.

| Surface # | | Curvature Radius | Thickness | Material | index | Abbe | Focal length |
|---|---|---|---|---|---|---|---|
| 0 | Object | Infinity | Infinity | | | | |
| 1(stop) | Lens 1 | 1.96 (ASP) | 0.49 | Plastic | 1.544 | 55.9 | 2.92 |
| 2 | | −7.71 (ASP) | 0.11 | | | | |
| 3 | Lens 2 | 6.02 (ASP) | 0.23 | Plastic | 1.632 | 23.4 | −3.84 |
| 4 | | 1.17 (ASP) | 0.27 | | | | |
| 5 | Lens 3 | 4.42 (ASP) | 0.48 | Plastic | 1.544 | 55.9 | 6.81 |
| 6 | | −22.05 (ASP) | 0.50 | | | | |
| 7 | Lens 4 | −2.16 (ASP) | 0.56 | Plastic | 1.535 | 55.5 | 2.32 |
| 8 | | −0.86 (ASP) | 0.12 | | | | |
| 9 | Lens 5 | −40.00 (ASP) | 0.63 | Plastic | 1.535 | 55.5 | −1.98 |
| 10 | | 1.09 (ASP) | 0.28 | | | | |
| 11 | IR-filter | Infinity | 0.21 | Glass | 1.517 | 64.2 | — |
| 12 | | Infinity | 0.69 | | | | |
| 13 | Image | Infinity | — | | | | |

TABLE 6

Aspheric Coefficients

| Surface # | 1 | 2 | 3 | 4 | 5 |
|---|---|---|---|---|---|
| k = | −3.28E+00 | −4.00E+01 | 2.20E+00 | −7.60E+00 | 6.89E+00 |
| A4 = | 3.75E−02 | 5.39E−02 | −3.54E−02 | 3.12E−02 | −8.06E−02 |
| A6 = | 1.19E−02 | −3.93E−02 | 1.01E−01 | 6.21E−02 | 1.78E−02 |
| A8 = | −6.38E−02 | −1.35E−02 | −9.84E−02 | −6.10E−02 | −3.33E−02 |
| A10 = | 6.32E−02 | −4.49E−03 | −3.21E−02 | −7.41E−04 | 5.14E−02 |
| A12 = | −3.25E−02 | 1.65E−03 | 5.55E−02 | 1.57E−02 | 1.06E−02 |
| A14 = | −2.47E−03 | 4.12E−03 | −2.30E−03 | −2.65E−04 | −1.33E−02 |
| A16 = | | | | | |
| A18 = | | | | | |

| Surface # | 6 | 7 | 8 | 9 | 10 |
|---|---|---|---|---|---|
| k = | −4.00E+01 | 1.97E+00 | −3.17E+00 | −5.00E+00 | −7.62E+00 |
| A4 = | −3.66E−02 | 4.07E−02 | −8.95E−02 | −6.08E−02 | −6.85E−02 |
| A6 = | −1.16E−02 | 3.04E−02 | 6.69E−02 | −8.78E−04 | 2.43E−02 |
| A8 = | −2.28E−02 | −1.94E−02 | −1.08E−02 | 6.23E−03 | −7.63E−03 |
| A10 = | −1.20E−02 | 1.38E−03 | 1.03E−03 | 1.72E−04 | 1.35E−03 |
| A12 = | 2.64E−02 | 3.90E−03 | 8.59E−04 | −1.23E−03 | −7.98E−05 |
| A14 = | 1.06E−03 | −3.92E−03 | −1.81E−04 | 4.11E−05 | −2.49E−05 |
| A16 = | | 3.75E−03 | −1.27E−04 | 1.49E−04 | 5.95E−06 |
| A18 = | | | | −2.58E−05 | −4.18E−07 |

Figure 4A:
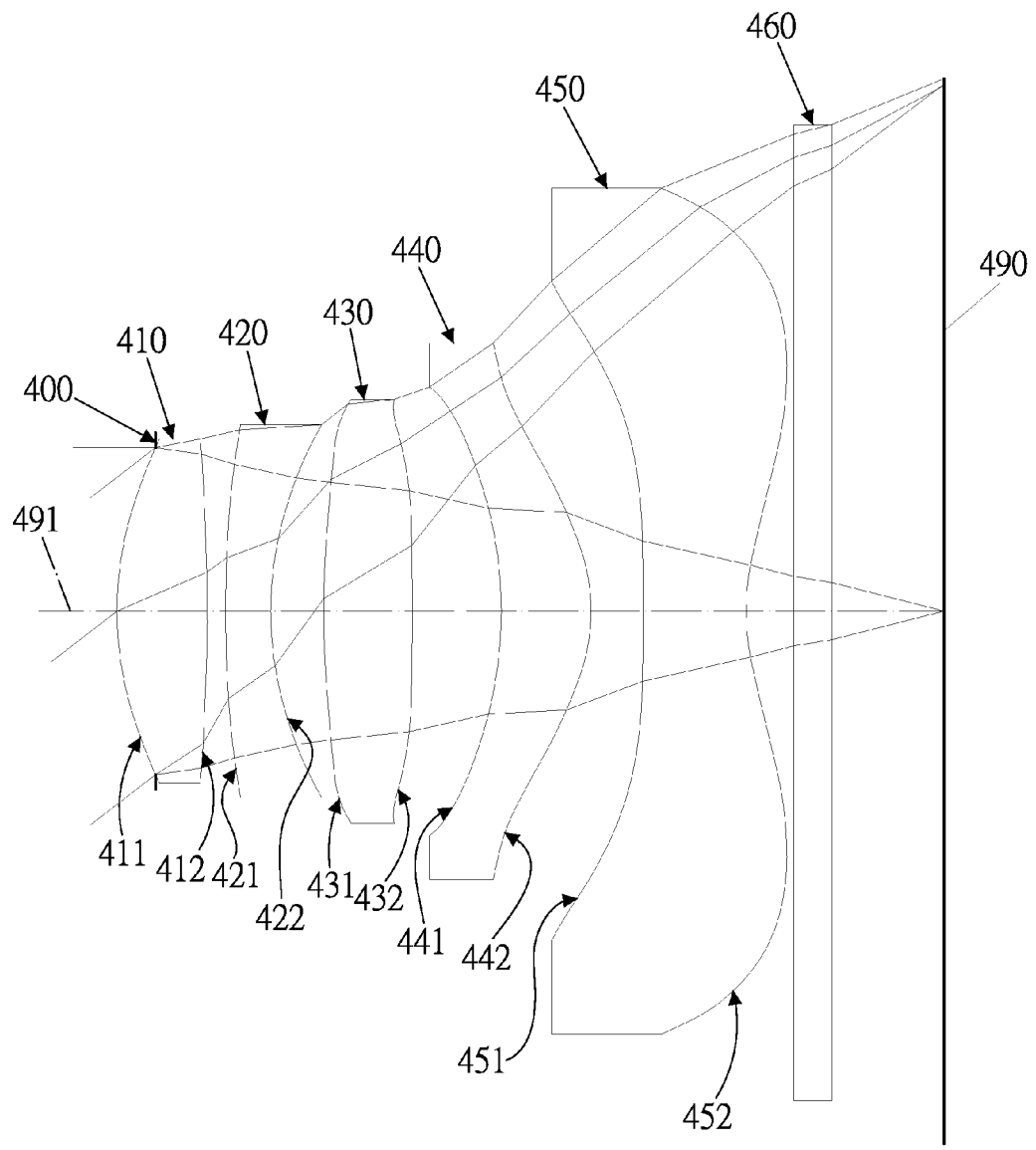
FIG. 4A shows an optical lens system in accordance with a fourth embodiment of the present invention.
Figure 4B:
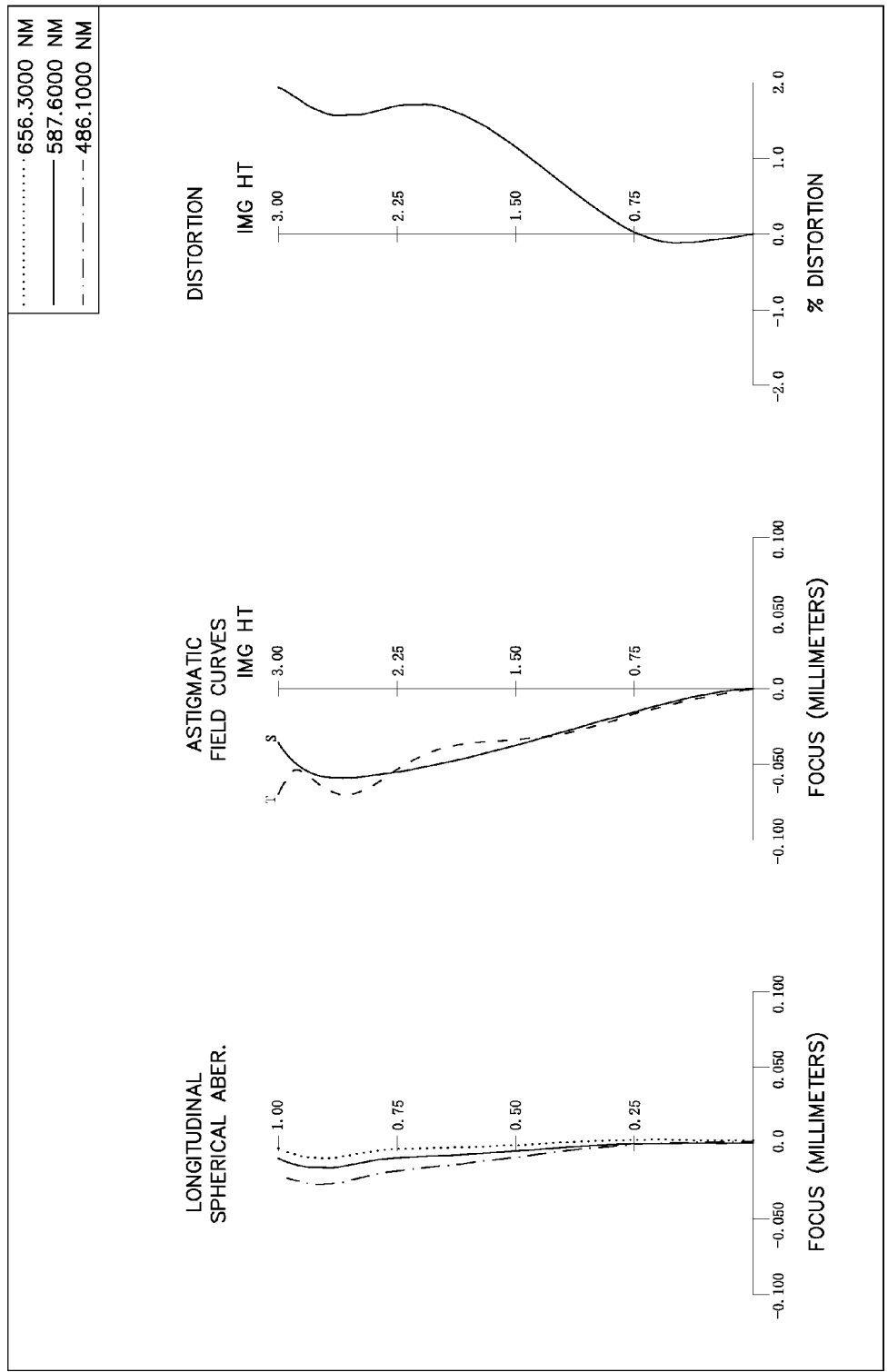
FIG. 4B shows the longitudinal spherical aberration curve, the astigmatic field curves and the distortion curve of the fourth embodiment of the present invention.

Referring to FIG. 4A, which shows an optical lens system in accordance with a fourth embodiment of the present invention, and FIG. 4B shows the longitudinal spherical aberration curves, the astigmatic field curves, and the distortion curve of the fourth embodiment of the present invention. An optical lens system in accordance with the fourth embodiment of the present invention comprises, in order from the object side to the image side:

A stop 400.

A first lens element 410 with a positive refractive power made of plastic has a convex object-side surface 411 and a convex image-side surface 412, and the object-side surface 411 and the image-side surface 412 of the first lens element 410 are aspheric.

A second lens element 420 with a negative refractive power made of plastic has an aspheric convex object-side surface 421, and an aspheric concave image-side surface 422.

A third lens element 430 with a positive refractive power made of plastic has an aspheric convex object-side surface 431, and an aspheric convex image-side surface 432.

A fourth lens element 440 with a positive refractive power made of plastic has an aspheric concave object-side surface 441, and an aspheric convex image-side surface 442.

A fifth lens element 450 with a negative refractive power made of plastic has a concave object-side surface 451 and an image-side surface 452, and the image-side surface 452 is concave near the optical axis, both of the object-side surface 451 and the image-side surface 452 are aspheric, and at least one inflection point is formed on the image-side surface 452.

An IR filter 460 made of glass is located between the image-side surface 452 of the fifth lens element 450 and an image plane 490 and has no influence on the focal length of the optical lens system.

The equation for the aspheric surface profiles of the fourth embodiment is expressed as follows:

$$z(h) = \frac{ch^2}{1+\sqrt{1-(1+k)c^2h^2}} + A_4h^4 + A_6h^6 + A_8h^8 + A_{10}h^{10} + A_{12}h^{12} + A_{14}h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14}$ . . . : represent the high-order aspheric coefficients.

In the fourth embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.70 (mm); Fno=2.05, HFOV=38.6 degrees, and FOV=77.2 degrees.

In the fourth embodiment of the present optical lens system, the focal length of the optical lens system is f, a focal length of the fourth lens element 440 is f4, and they satisfy the condition: f4/f=0.82.

In the fourth embodiment of the present optical lens system, the focal length of the optical lens system is f, a focal length of the fifth lens element 450 is f5, and they satisfy the condition: f5/f=−0.63.

In the fourth embodiment of the present optical lens system, a focal length of the first lens element 410 is f1, the focal length of the optical lens system is f, and they satisfy the condition: f1/f=0.77.

In the fourth embodiment of the present optical lens system, a focal length of the third lens element 430 is f3, the focal length of the optical lens system is f, and they satisfy the condition: f3/f=1.90.

In the fourth embodiment of the present optical lens system, a distance between the object-side surface 451 and the image-side surface 452 of the fifth lens element 450 along an optical axis 491 is D9, a distance between the object-side surface 441 and the image-side surface 442 of the fourth lens element 440 along the optical axis 491 is D7, the focal length of the optical lens system is f, and they satisfy the condition: (D9−D7)×10/f=0.20.

In the fourth embodiment of the present optical lens system, a radius of curvature of the object-side surface 441 of the fourth lens element 440 is R7, a radius of curvature of the image-side surface 442 of the fourth lens element 440 is R8, and they satisfy the condition: (R7−R8)/(R7+R8)=0.36.

In the fourth embodiment of the present optical lens system, a radius of curvature of the object-side surface 451 of the fifth lens element 450 is R9, the focal length of the optical lens system is f, and they satisfy the condition: |R9|/f=7.37.

In the fourth embodiment of the present optical lens system, a focal length of the second lens element 420 is f2, the focal length of the optical lens system is f, and they satisfy the condition: f2/f=−1.01.

In the fourth embodiment of the present optical lens system, a refraction index of the second lens element 420 is Nd2, and an Abbe number of the second lens element 420 is Vd2, and they satisfy the conditions: Nd2=1.632; Vd2=23.40.

In the fourth embodiment of the present optical lens system, a refraction index of the third lens element 430 is Nd3, and an Abbe number of the third lens element 430 is Vd3, and they satisfy the conditions: Nd3=1.544; Vd3=55.90.

In the fourth embodiment of the present optical lens system, a distance from the object-side surface 411 of the first lens element 410 to the image plane 490 along the optical axis 491 is TL, and a half of the maximum image height of the present optical lens system is ImgH, and they satisfy the condition: TL/ImgH=1.52.

The detailed optical data of the fourth embodiment is shown in table 7, and the aspheric surface data is shown in table 8, wherein the units of the radius of curvature, the thickness and the focal length in table 7 are expressed in mm, and in table 8, k represents the conic constant, and $A_4, A_6, A_8, A_{10}, A_{12}, A_{14}$ . . . : represent the high-order aspheric coefficients. In the tables 7 and 8, the surfaces 1 and 2 represent the object-side surface 411 and the image-side surface 412 of the first lens element 410, respectively, the surfaces 3 and 4 represent the object-side surface 421 and the image-side surface 422 of the second lens element 420, respectively, the surfaces 5 and 6 represent the object-side surface 431 and the image-side surface 432 of the third lens element 430, respectively, the surfaces 7 and 8 represent the object-side surface 441 and the image-side surface 442 of the fourth lens element 440, respectively, and the surfaces 9 and 10 represent the object-side surface 451 and the imag-eside surface 452 of the fifth lens element 450, respectively.

TABLE 7

(Embodiment 4)
f (focal length) = 3.70 mm, Fno = 2.05, HFOV = 38.6 deg.

| Surface # | | Curvature Radius | Thickness | Material | index | Abbe | Focal length |
|---|---|---|---|---|---|---|---|
| 0 | Object | Infinity | Infinity | | | | |
| 1(stop) | Lens 1 | 1.90 (ASP) | 0.50 | Plastic | 1.544 | 55.9 | 2.84 |
| 2 | | −7.41 (ASP) | 0.10 | | | | |
| 3 | Lens 2 | 6.95 (ASP) | 0.25 | Plastic | 1.632 | 23.4 | −3.74 |
| 4 | | 1.74 (ASP) | 0.29 | | | | |
| 5 | Lens 3 | 4.50 (ASP) | 0.49 | Plastic | 1.544 | 55.9 | 7.04 |

TABLE 7-continued (Embodiment 4)
f (focal length) = 3.70 mm, Fno = 2.05, HFOV = 38.6 deg.

| Surface # | | Curvature Radius | Thickness | Material | index | Abbe | Focal length |
|---|---|---|---|---|---|---|---|
| 6 | | −24.67 (ASP) | 0.49 | | | | |
| 7 | Lens 4 | −2.13 (ASP) | 0.50 | Plastic | 1.535 | 55.5 | 3.02 |
| 8 | | −0.99 (ASP) | 0.29 | | | | |
| 9 | Lens 5 | −27.28 (ASP) | 0.57 | Plastic | 1.515 | 57.2 | −2.33 |
| 10 | | 1.26 (ASP) | 0.26 | | | | |
| 11 | IR-filter | Infinity | 0.21 | Glass | 1.517 | 64.2 | — |
| 12 | | Infinity | 0.62 | | | | |
| 13 | Image | Infinity | — | | | | |

TABLE 8

Aspheric Coefficients

| Surface # | 1 | 2 | 3 | 4 | 5 |
|---|---|---|---|---|---|
| k = | −3.20E+00 | −3.62E+01 | 1.45E+01 | −7.72E+00 | 5.44E+00 |
| A4 = | 4.04E−02 | 5.58E−02 | −2.88E−02 | 3.53E−02 | −8.01E−02 |
| A6 = | 1.59E−02 | −2.51E−02 | 1.05E−01 | 6.75E−02 | 1.77E−02 |
| A8 = | −6.61E−02 | −1.37E−02 | −9.19E−02 | −5.67E−02 | −3.32E−02 |
| A10 = | 6.56E−02 | −1.06E−02 | −3.60E−02 | −2.52E−03 | 4.88E−02 |
| A12 = | −2.71E−02 | 5.12E−03 | 4.94E−02 | 1.17E−02 | 1.19E−02 |
| A14 = | −4.97E−03 | 3.52E−03 | −4.78E−04 | 2.22E−03 | −1.28E−02 |
| A16 = | | | | | |
| A18 = | | | | | |

| Surface # | 6 | 7 | 8 | 9 | 10 |
|---|---|---|---|---|---|
| k = | 4.00E+01 | 1.87E+00 | −3.13E+00 | 5.00E+01 | −7.51E+00 |
| A4 = | −3.95E−02 | 6.37E−02 | −6.02E−02 | −7.50E−02 | −6.75E−02 |
| A6 = | −1.39E−02 | 1.99E−02 | 6.03E−02 | 2.82E−03 | 2.17E−02 |
| A8 = | −2.24E−02 | −2.27E−02 | −1.27E−02 | 6.34E−03 | −6.58E−03 |
| A10 = | −1.22E−02 | 1.94E−03 | 9.20E−04 | 1.19E−04 | 1.19E−03 |
| A12 = | 2.59E−02 | 5.01E−03 | 9.71E−04 | −1.24E−04 | −8.15E−05 |
| A14 = | 5.80E−04 | −3.65E−03 | −1.22E−04 | 3.84E−05 | −2.35E−05 |
| A16 = | | 3.29E−03 | −1.28E−04 | 1.49E−04 | 6.13E−06 |
| A18 = | | | | −2.54E−05 | −4.50E−07 |

Figure 5A:
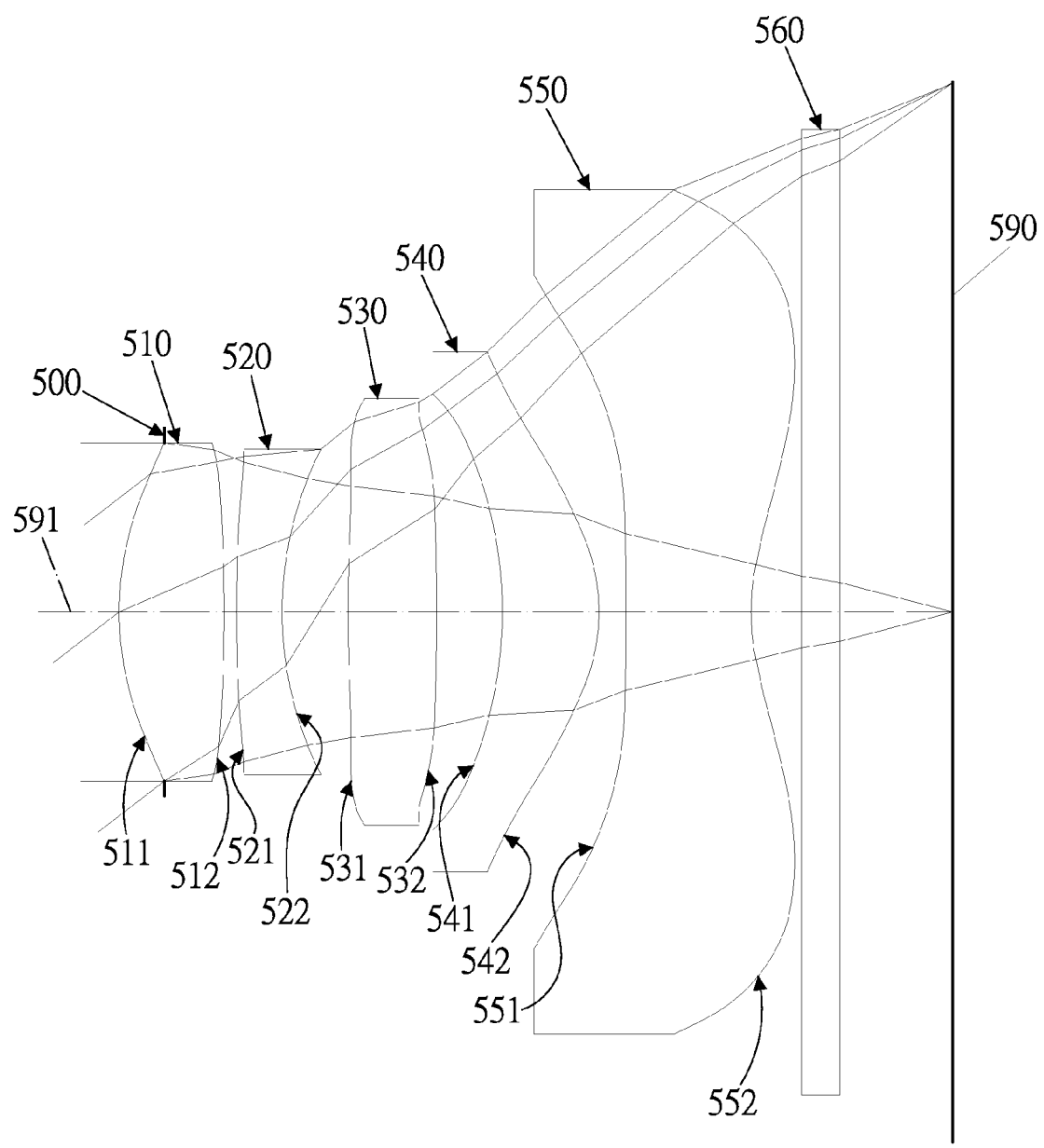
FIG. 5A shows an optical lens system in accordance with a fifth embodiment of the present invention.
Figure 5B:
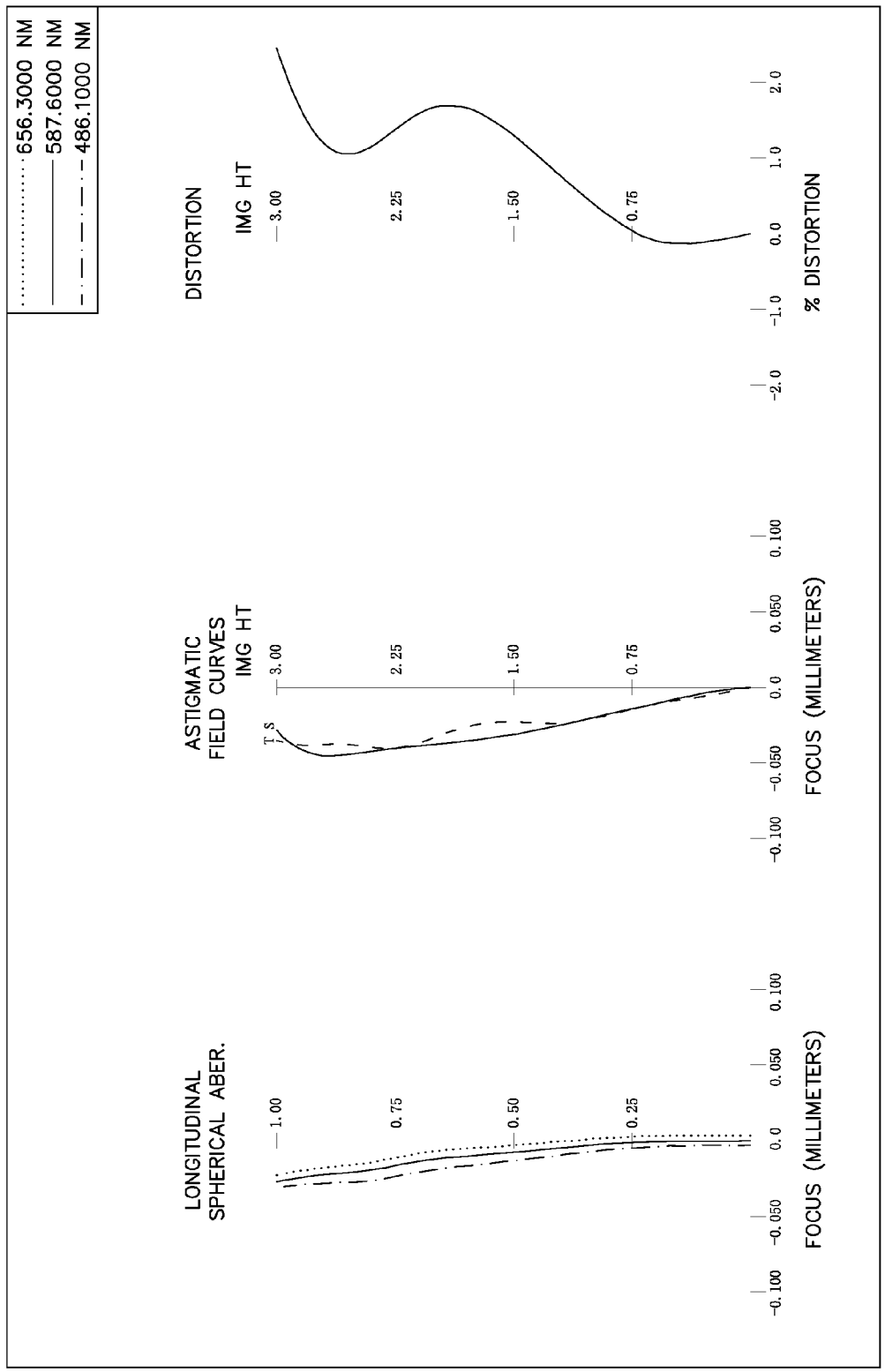
FIG. 5B shows the longitudinal spherical aberration curve, the astigmatic field curves and the distortion curve of the fifth embodiment of the present invention.

Referring to FIG. 5A, which shows an optical lens system in accordance with a fifth embodiment of the present invention, and FIG. 5B shows the longitudinal spherical aberration curves, the astigmatic field curves, and the distortion curve of the fifth embodiment of the present invention. An optical lens system in accordance with the fifth embodiment of the present invention comprises, in order from the object side to the image side:

A stop 500.

A first lens element 510 with a positive refractive power made of plastic has a convex object-side surface 511 and a convex image-side surface 512, and the object-side surface 511 and the image-side surface 512 of the first lens element 510 are aspheric.

A second lens element 520 with a negative refractive power made of plastic has an aspheric convex object-side surface 521, and an aspheric concave image-side surface 522.

A third lens element 530 with a positive refractive power made of plastic has an aspheric convex object-side surface 531, and an aspheric convex image-side surface 532.

A fourth lens element 540 with a positive refractive power made of plastic has aspheric concave object-side surface 541, and an aspheric convex image-side surface 542.

A fifth lens element 550 with a negative refractive power made of plastic has a concave object-side surface 551 and an image-side surface 552, and the image-side surface 552 is concave near the optical axis, both of the object-side surface 551 and the image-side surface 552 are aspheric, and at least one inflection point is formed on the image-side surface 552.

An IR filter 560 made of glass is located between the image-side surface 552 of the fifth lens element 550 and an image plane 590 and has no influence on the focal length of the optical lens system.

The equation for the aspheric surface profiles of the fifth embodiment is expressed as follows:

$$z(h) = \frac{ch^2}{1+\sqrt{1-(1+k)c^2h^2}} + A_4 h^4 + A_6 h^6 + A_8 h^8 + A_{10} h^{10} + A_{12} h^{12} + A_{14} h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14} \ldots$ : represent the high-order aspheric coefficients.

In the fifth embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.70 (mm); Fno=2.0, HFOV=38.4 degrees, and FOV=76.8 degrees.

In the fifth embodiment of the present optical lens system, the focal length of the optical lens system is f, a focal length of the fourth lens element 540 is f4, and they satisfy the condition: f4/f=0.75.

In the fifth embodiment of the present optical lens system, the focal length of the optical lens system is f, a focal length of the fifth lens element 550 is f5, and they satisfy the condition: f5/f=−0.61.

In the fifth embodiment of the present optical lens system, a focal length of the first lens element 510 is f1, the focal length of the optical lens system is f, and they satisfy the condition: f1/f=0.71.

In the fifth embodiment of the present optical lens system, a focal length of the third lens element 530 is f3, the focal length of the optical lens system is f, and they satisfy the condition: f3/f=3.23.

In the fifth embodiment of the present optical lens system, a distance between the object-side surface 551 and the image-side surface 552 of the fifth lens element 550 along an optical axis 591 is D9, a distance between the object-side surface 541 and the image-side surface 542 of the fourth lens element 540 along the optical axis 591 is D7, the focal length of the optical lens system is f, and they satisfy the condition: (D9−D7)×10/f=0.42.

In the fifth embodiment of the present optical lens system, a radius of curvature of the object-side surface 541 of the fourth lens element 540 is R7, a radius of curvature of the image-side surface 542 of the fourth lens element 540 is R8, and they satisfy the condition: (R7−R8)/(R7+R8)=0.38.

In the fifth embodiment of the present optical lens system, a radius of curvature of the object-side surface 551 of the fifth lens element 550 is R9, the focal length of the optical lens system is f, and they satisfy the condition: |R9|/f=13.51.

In the fifth embodiment of the present optical lens system, a focal length of the second lens element 520 is f2, the focal length of the optical lens system is f, and they satisfy the condition: f2/f=−1.09.

In the fifth embodiment of the present optical lens system, a refraction index of the second lens element 520 is Nd2, and an Abbe number of the second lens element 520 is Vd2, and they satisfy the conditions: Nd2=1.632; Vd2=23.40.

In the fifth embodiment of the present optical lens system, a refraction index of the third lens element 530 is Nd3, and an Abbe number of the third lens element 530 is Vd3, and they satisfy the conditions: Nd3=1.544; Vd3=55.90.

In the fifth embodiment of the present optical lens system, a distance from the object-side surface 511 of the first lens element 510 to the image plane 590 along the optical axis 591 is TL, and a half of the maximum image height of the present optical lens system is ImgH, and they satisfy the condition: TL/ImgH=1.52.

The detailed optical data of the fifth embodiment is shown in table 9, and the aspheric surface data is shown in table 10, wherein the units of the radius of curvature, the thickness and the focal length in table 9 are expressed in mm, and in table 10, k represents the conic constant, and $A_4, A_6, A_8, A_{10}, A_{12}, A_{14}$ ... : represent the high-order aspheric coefficients. In the tables 9 and 10, the surfaces 1 and 2 represent the object-side surface 511 and the image-side surface 512 of the first lens element 510, respectively, the surfaces 3 and 4 represent the object-side surface 521 and the image-side surface 522 of the second lens element 520, respectively, the surfaces 5 and 6 represent the object-side surface 531 and the image-side surface 532 of the third lens element 530, respectively, the surfaces 7 and 8 represent the object-side surface 541 and the image-side surface 542 of the fourth lens element 540, respectively, and the surfaces 9 and 10 represent the object-side surface 551 and the image-side surface 552 of the fifth lens element 550, respectively.

TABLE 9

(Embodiment 5)
f (focal length) = 3.70 mm, Fno = 2.0, HFOV = 38.4 deg.

| Surface # | | Curvature Radius | Thickness | Material | index | Abbe | Focal length |
|---|---|---|---|---|---|---|---|
| 0 | Object | Infinity | Infinity | | | | |
| 1(stop) | Lens 1 | 1.71 (ASP) | 0.58 | Plastic | 1.544 | 55.9 | 2.64 |
| 2 | | −8.03 (ASP) | 0.07 | | | | |
| 3 | Lens 2 | 7.45 (ASP) | 0.25 | Plastic | 1.632 | 23.4 | −4.03 |
| 4 | | 1.88 (ASP) | 0.36 | | | | |
| 5 | Lens 3 | 7.95 (ASP) | 0.48 | Plastic | 1.544 | 55.9 | 11.95 |
| 6 | | −35.00 (ASP) | 0.36 | | | | |
| 7 | Lens 4 | −2.13 (ASP) | 0.53 | Plastic | 1.535 | 55.5 | 2.78 |
| 8 | | −0.95 (ASP) | 0.15 | | | | |
| 9 | Lens 5 | −50.00 (ASP) | 0.69 | Plastic | 1.515 | 57.2 | −2.26 |
| 10 | | 1.19 (ASP) | 0.28 | | | | |
| 11 | IR−filter | Infinity | 0.21 | Glass | 1.517 | 64.2 | — |
| 12 | | Infinity | 0.62 | | | | |
| 13 | Image | Infinity | — | | | | |

TABLE 10

Aspheric Coefficients

| Surface # | 1 | 2 | 3 | 4 | 5 |
|---|---|---|---|---|---|
| k = | −2.25E+00 | 2.03E+01 | 2.57E+00 | −7.86E+00 | 2.02E+00 |
| A4 = | 4.69E−02 | 5.36E−02 | −3.09E−02 | 4.61E−02 | −8.05E−02 |
| A6 = | 1.06E−02 | −3.69E−02 | 9.45E−02 | 7.52E−02 | 2.27E−02 |
| A8 = | −6.85E−02 | −3.36E−02 | −1.01E−01 | −5.34E−02 | −3.03E−02 |
| A10 = | 7.13E−02 | −1.97E−02 | −4.47E−02 | −3.12E−04 | 5.08E−02 |
| A12 = | −2.65E−02 | 5.37E−03 | 5.11E−02 | 1.40E−02 | 1.28E−02 |
| A14 = | −3.07E−02 | −4.90E−04 | 1.49E−02 | 6.20E−03 | −1.42E−02 |
| A16 = | | | | | |
| A18 = | | | | | |

| Surface # | 6 | 7 | 8 | 9 | 10 |
|---|---|---|---|---|---|
| k = | −4.00E+01 | 1.95E+00 | −3.16E+00 | 7.26E+00 | −7.56E+00 |
| A4 = | −5.25E−02 | 6.43E−02 | −6.98E−02 | −7.56E−02 | −6.30E−02 |
| A6 = | −8.14E−04 | 1.59E−02 | 5.79E−02 | 3.50E−03 | 1.98E−02 |
| A8 = | −2.25E−02 | −2.66E−02 | −1.34E−02 | 6.01E−03 | −5.72E−03 |
| A10 = | −1.35E−02 | 1.34E−03 | 8.55E−04 | 1.38E−04 | 8.41E−04 |
| A12 = | 2.53E−02 | 5.33E−03 | 9.27E−04 | −1.24E−03 | −2.32E−05 |
| A14 = | 1.50E−05 | −3.39E−03 | −1.19E−03 | 3.95E−05 | −2.24E−05 |
| A16 = | | 3.73E−03 | −1.25E−04 | 1.50E−04 | 4.72E−06 |
| A18 = | | | | −2.57E−05 | −3.34E−07 |

Figure 6A:
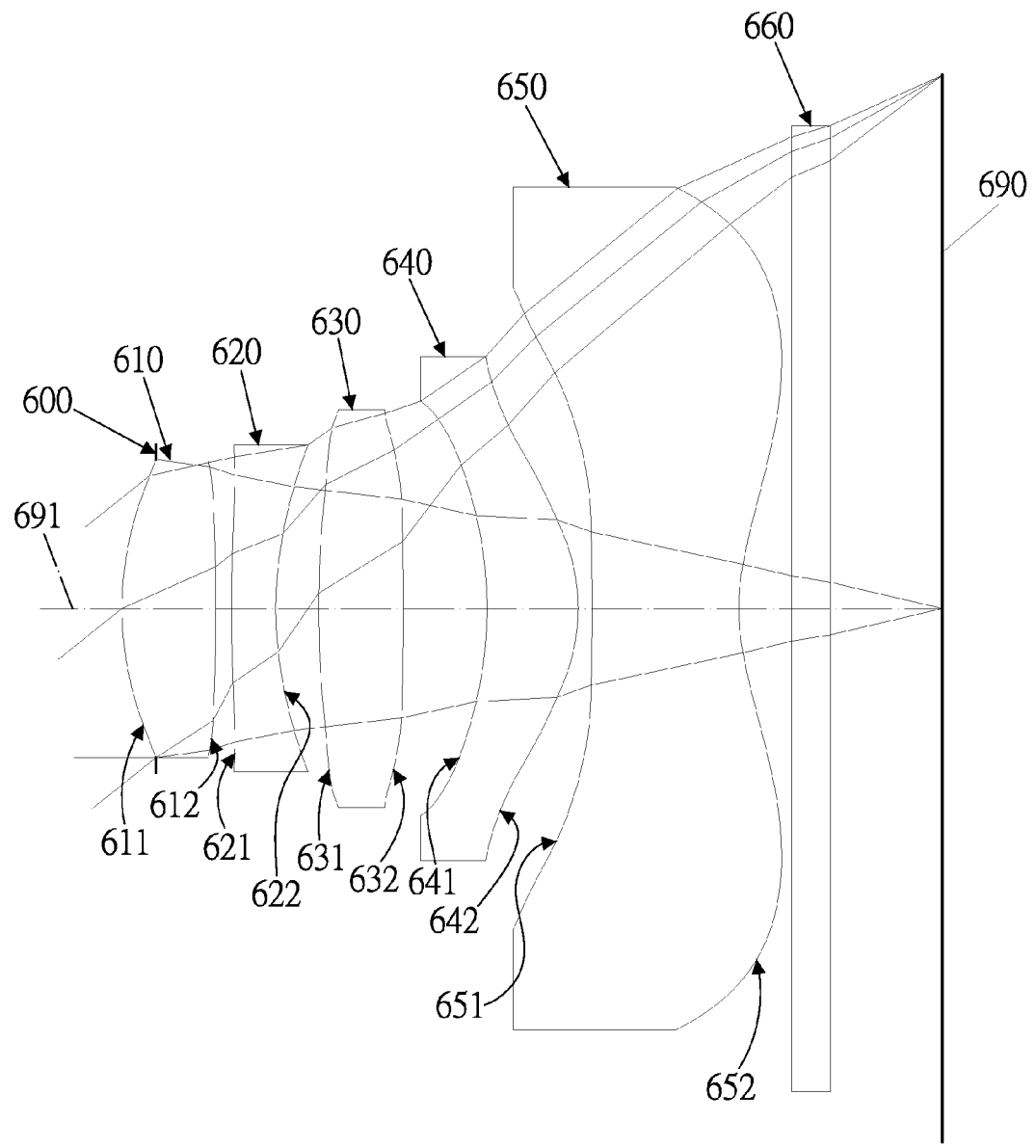
FIG. 6A shows an optical lens system in accordance with a sixth embodiment of the present invention.
Figure 6B:
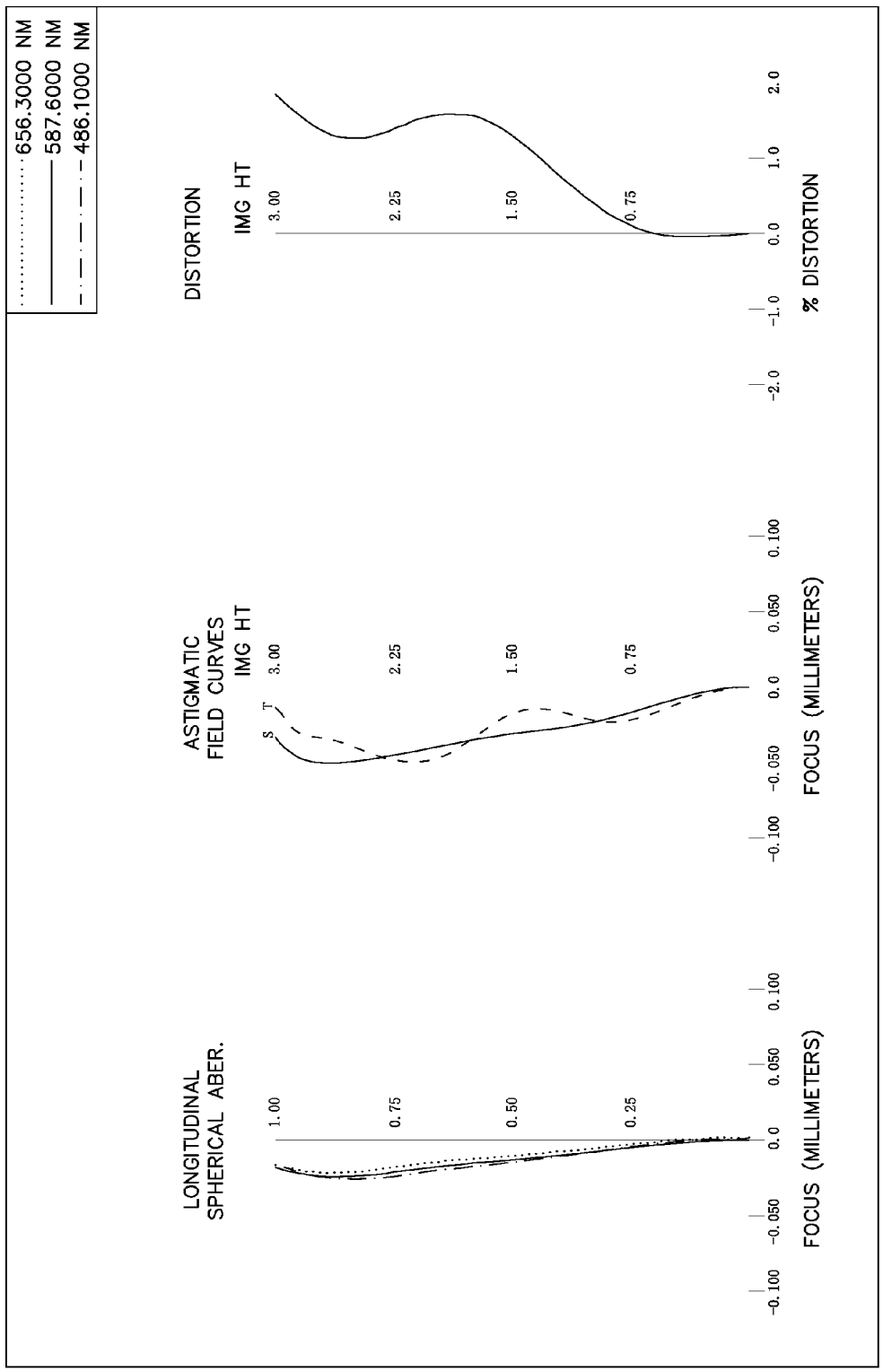
FIG. 6B shows the longitudinal spherical aberration curve, the astigmatic field curves and the distortion curve of the sixth embodiment of the present invention.

Referring to FIG. 6A, which shows an optical lens system in accordance with a sixth embodiment of the present invention, and FIG. 6B shows the longitudinal spherical aberration curves, the astigmatic field curves, and the distortion curve of the sixth embodiment of the present invention. An optical lens system in accordance with the sixth embodiment of the present invention comprises, in order from the object side to the image side:

A stop 600.

A first lens element 610 with a positive refractive power made of plastic has a convex object-side surface 611 and a convex image-side surface 612, and the object-side surface 611 and the image-side surface 612 of the first lens element 610 are aspheric.

A second lens element 620 with a negative refractive power made of plastic has an aspheric convex object-side surface 621, and an aspheric concave image-side surface 622.

A third lens element 630 with a positive refractive power made of plastic has an aspheric convex object-side surface 631, and an aspheric convex image-side surface 632.

A fourth lens element 640 with a positive refractive power made of plastic has aspheric concave object-side surface 641, and an aspheric convex image-side surface 642.

A fifth lens element 650 with a negative refractive power made of plastic has a concave object-side surface 651 and an image-side surface 652, and the image-side surface 652 is concave near the optical axis, both of the object-side surface 651 and the image-side surface 652 are aspheric, and at least one inflection point is formed on the image-side surface 652.

An IR filter 660 made of glass is located between the image-side surface 652 of the fifth lens element 650 and an image plane 690 and has no influence on the focal length of the optical lens system.

The equation for the aspheric surface profiles of the sixth embodiment is expressed as follows:

$$z(h) = \frac{ch^2}{1+\sqrt{1-(1+k)c^2h^2}} + A_4 h^4 + A_6 h^6 + A_8 h^8 + A_{10} h^{10} + A_{12} h^{12} + A_{14} h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the sixth embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.57 (mm); Fno=2.2, HFOV=39.6 degrees, and FOV=79.2 degrees.

In the sixth embodiment of the present optical lens system, the focal length of the optical lens system is f, a focal length of the fourth lens element 640 is f4, and they satisfy the condition: f4/f=0.79.

In the sixth embodiment of the present optical lens system, the focal length of the optical lens system is f, a focal length of the fifth lens element 650 is f5, and they satisfy the condition: f5/f=−0.61.

In the sixth embodiment of the present optical lens system, a focal length of the first lens element 610 is f1, the focal length of the optical lens system is f, and they satisfy the condition: f1/f=0.78.

In the sixth embodiment of the present optical lens system, a focal length of the third lens element 630 is f3, the focal length of the optical lens system is f, and they satisfy the condition: f3/f=1.89.

In the sixth embodiment of the present optical lens system, a distance between the object-side surface 651 and the image-side surface 652 of the fifth lens element 650 along an optical axis 691 is D9, a distance between the object-side surface 641 and the image-side surface 642 of the fourth lens element 640 along the optical axis 691 is D7, the focal length of the optical lens system is f, and they satisfy the condition: (D9−D7)×10/f=0.85.

In the sixth embodiment of the present optical lens system, a radius of curvature of the object-side surface 641 of the fourth lens element 640 is R7, a radius of curvature of the image-side surface 642 of the fourth lens element 640 is R8, and they satisfy the condition: (R7−R8)/(R7+R8)=0.35.

In the sixth embodiment of the present optical lens system, a radius of curvature of the object-side surface 651 of the fifth lens element 650 is R9, the focal length of the optical lens system is f, and they satisfy the condition: |R9|/f=14.01.

In the sixth embodiment of the present optical lens system, a focal length of the second lens element 620 is f2, the focal length of the optical lens system is f, and they satisfy the condition: f2/f=−1.08.

In the sixth embodiment of the present optical lens system, a refraction index of the second lens element 620 is Nd2, and an Abbe number of the second lens element 620 is Vd2, and they satisfy the conditions: Nd2=1.632; Vd2=23.40.

In the sixth embodiment of the present optical lens system, a refraction index of the third lens element 630 is Nd3, and an Abbe number of the third lens element 630 is Vd3, and they satisfy the conditions: Nd3=1.544; Vd3=55.90.

In the sixth embodiment of the present optical lens system, a distance from the object-side surface 611 of the first lens element 610 to the image plane 690 along the optical axis 691 is TL, and a half of the maximum image height of the present optical lens system is ImgH, and they satisfy the condition: TL/ImgH=1.49.

The detailed optical data of the sixth embodiment is shown in table 11, and the aspheric surface data is shown in table 12, wherein the units of the radius of curvature, the thickness and the focal length in table 11 are expressed in mm, and in table 12, k represents the conic constant, and $A_4$, $A_6$, $A_8$, $A_{10}$, $A_{12}$, $A_{14}$ . . . : represent the high-order aspheric coefficients. In the tables 11 and 12, the surfaces 1 and 2 represent the object-side surface 611 and the image-side surface 612 of the first lens element 610, respectively, the surfaces 3 and 4 represent the object-side surface 621 and the image-side surface 622 of the second lens element 620, respectively, the surfaces 5 and 6 represent the object-side surface 631 and the image-side surface 632 of the third lens element 630, respectively, the surfaces 7 and 8 represent the object-side surface 641 and the image-side surface 642 of the fourth lens element 640, respectively, and the surfaces 9 and 10 represent the object-side surface 651 and the image-side surface 652 of the fifth lens element 650, respectively.

TABLE 11

(Embodiment 6)
f (focal length) = 3.57 mm, Fno = 2.2, HFOV = 39.6 deg.

| Surface # | | Curvature Radius | Thickness | Material | index | Abbe | Focal length |
|---|---|---|---|---|---|---|---|
| 0 | Object | Infinity | Infinity | | | | |
| 1(stop) | Lens 1 | 1.75 (ASP) | 0.51 | Plastic | 1.544 | 55.9 | 2.79 |

TABLE 11-continued (Embodiment 6)
f (focal length) = 3.57 mm, Fno = 2.2, HFOV = 39.6 deg.

| Surface # | | Curvature Radius | Thickness | Material | index | Abbe | Focal length |
|---|---|---|---|---|---|---|---|
| 2 | | −10.20 (ASP) | 0.09 | | | | |
| 3 | Lens 2 | 11.69 (ASP) | 0.24 | Plastic | 1.632 | 23.4 | −3.86 |
| 4 | | 2.00 (ASP) | 0.23 | | | | |
| 5 | Lens 3 | 4.17 (ASP) | 0.46 | Plastic | 1.544 | 55.9 | 6.76 |
| 6 | | −30.00 (ASP) | 0.45 | | | | |
| 7 | Lens 4 | −1.93 (ASP) | 0.50 | Plastic | 1.535 | 55.5 | 2.83 |
| 8 | | −0.92 (ASP) | 0.07 | | | | |
| 9 | Lens 5 | −50.00 (ASP) | 0.80 | Plastic | 1.515 | 55.2 | −2.17 |
| 10 | | 1.19 (ASP) | 0.29 | | | | |
| 11 | IR-filter | Infinity | 0.21 | Glass | 1.517 | 64.2 | — |
| 12 | | Infinity | 0.61 | | | | |
| 13 | Image | Infinity | — | | | | |

TABLE 12

Aspheric Coefficients

| Surface # | 1 | 2 | 3 | 4 | 5 |
|---|---|---|---|---|---|
| k = | −2.26+00 | 1.80E+01 | 4.00E+01 | −1.12E+01 | 2.00E−01 |
| A4 = | 4.34E−02 | 5.10E−02 | −3.23E−02 | 4.62E−02 | −8.47E−02 |
| A6 = | 1.73E−03 | −4.41E−02 | 9.65E−02 | 5.42E−02 | 2.19E−02 |
| A8 = | −5.68E−02 | −6.13E−02 | −1.70E−01 | −8.65E−02 | −2.44E−02 |
| A10 = | 8.13E−02 | −6.13E−02 | −7.95E−02 | 9.85E−03 | 4.60E−02 |
| A12 = | −9.29E−02 | 2.54E−02 | 9.96E−02 | 1.72E−02 | 8.37E−03 |
| A14 = | −7.79E−03 | 2.43E−02 | 5.61E−02 | 1.29E−02 | −9.02E−03 |
| A16 = | | | | | |
| A18 = | | | | | |

| Surface # | 6 | 7 | 8 | 9 | 10 |
|---|---|---|---|---|---|
| k = | 4.00E+01 | 1.80E+00 | −3.21E+00 | −4.00E+01 | −7.46E+00 |
| A4 = | −4.52E−02 | 1.10E−01 | −8.26E−02 | −9.18E−02 | −7.18E−02 |
| A6 = | 2.69E−02 | −9.06E−03 | 9.89E−02 | 1.85E−03 | 2.74E−02 |
| A8 = | −8.29E−02 | 1.28E−02 | −2.28E−02 | 9.98E−03 | −9.46E−03 |
| A10 = | 1.97E−02 | −6.83E−03 | −6.96E−04 | 9.33E−04 | 1.77E−03 |
| A12 = | 4.53E−02 | −1.49E−02 | 1.13E−03 | −2.36E−03 | −6.12E−05 |
| A14 = | −1.06E−02 | −5.90E−03 | −1.38E−04 | 8.82E−05 | −5.27E−05 |
| A16 = | | 1.58E−02 | −9.59E−05 | 3.32E−04 | 1.10E−05 |
| A18 = | | | | −6.61E−05 | −7.28E−07 |

Figure 7A:
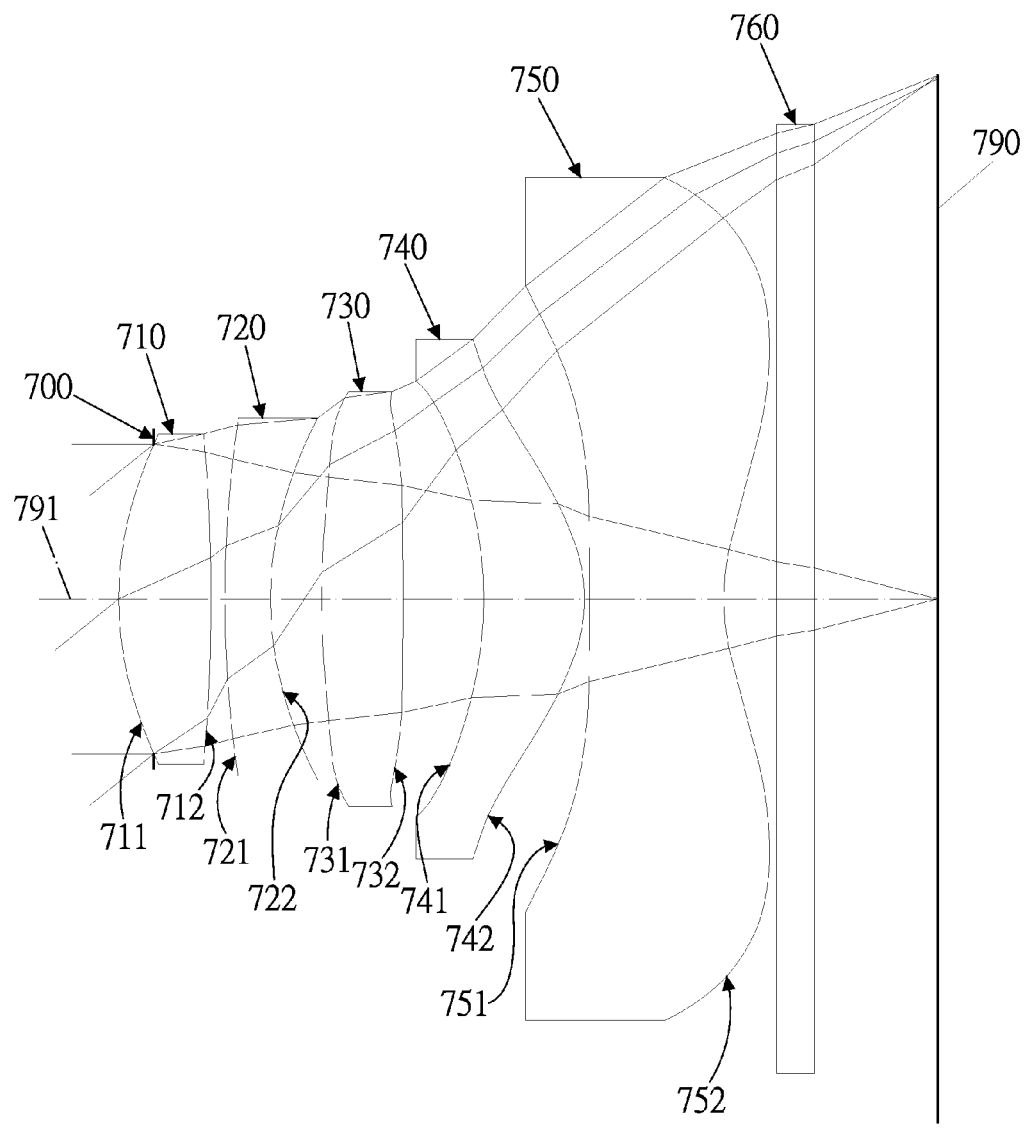
FIG. 7A shows an optical lens system in accordance with a seventh embodiment of the present invention.
Figure 7B:
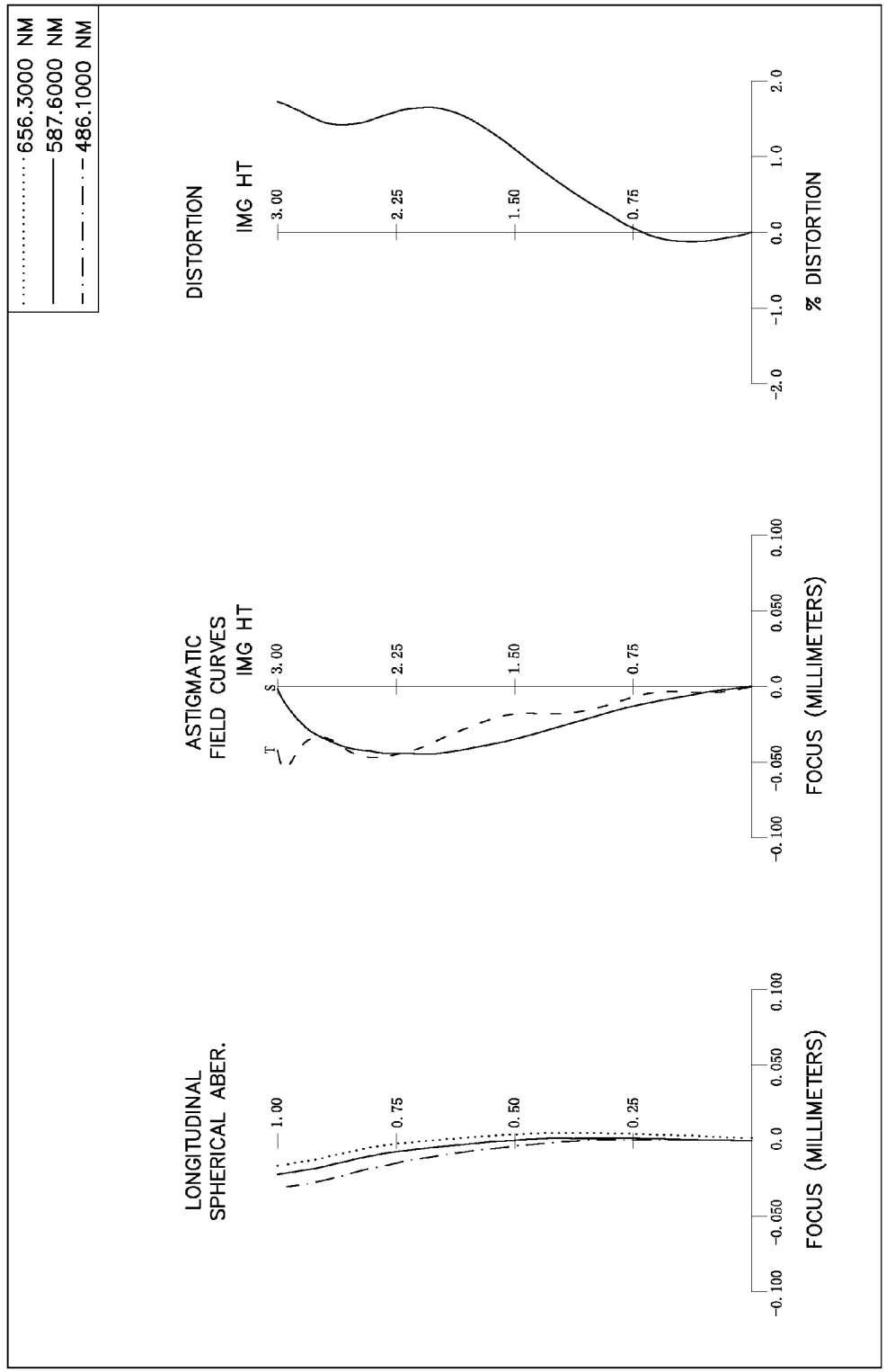
FIG. 7B shows the longitudinal spherical aberration curve, the astigmatic field curves and the distortion curve of the seventh embodiment of the present invention.

Referring to FIG. 7A, which shows an optical lens system in accordance with a seventh embodiment of the present invention, and FIG. 7B shows the longitudinal spherical aberration curves, the astigmatic field curves, and the distortion curve of the seventh embodiment of the present invention. An optical lens system in accordance with the seventh embodiment of the present invention comprises, in order from the object side to the image side:

A stop 700.

A first lens element 710 with a positive refractive power made of plastic has a convex object-side surface 711 and a convex image-side surface 712, and the object-side surface 711 and the image-side surface 712 of the first lens element 710 are aspheric.

A second lens element 720 with a negative refractive power made of plastic has an aspheric convex object-side surface 721, and an aspheric concave image-side surface 722.

A third lens element 730 with a positive refractive power made of plastic has a convex object-side surface 731 and an image-side surface 732, and the image-side surface 732 is flat near the optical axis, both of object-side surface 731 and image-side surface 732 thereof being aspheric.

A fourth lens element 740 with a positive refractive power made of plastic has aspheric concave object-side surface 741, and an aspheric convex image-side surface 742.

A fifth lens element 750 with a negative refractive power made of plastic has a concave object-side surface 751 and an image-side surface 752, and the image-side surface 752 is concave near the optical axis, both of the object-side surface 751 and the image-side surface 752 are aspheric, and at least one inflection point is formed on the image-side surface 752.

An IR filter 760 made of glass is located between the image-side surface 752 of the fifth lens element 750 and an image plane 790 and has no influence on the focal length of the optical lens system.

The equation for the aspheric surface profiles of the seventh embodiment is expressed as follows:

$$z(h) = \frac{ch^2}{1+\sqrt{1-(1+k)c^2h^2}} + A_4h^4 + A_6h^6 + A_8h^8 + A_{10}h^{10} + A_{12}h^{12} + A_{14}h^{14} + \cdots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14}$ . . . : represent the high-order aspheric coefficients.

In the seventh embodiment of the present optical lens system, the focal length of the optical lens system is f, the f-number of the optical lens system is Fno, half of the maximum angle of field of view of the present optical lens system is HFOV, the maximum angle of field of view of the present optical lens system is FOV, and they satisfy the conditions: f=3.53 (mm); Fno=2.05, HFOV=39.9 degrees, and FOV=79.8 degrees.

In the seventh embodiment of the present optical lens system, the focal length of the optical lens system is f, a focal length of the fourth lens element 740 is f4, and they satisfy the condition: f4/f=0.63.

In the seventh embodiment of the present optical lens system, the focal length of the optical lens system is f, a focal length of the fifth lens element 750 is f5, and they satisfy the condition: f5/f=−0.56.

In the seventh embodiment of the present optical lens system, a focal length of the first lens element 710 is f1, the focal length of the optical lens system is f, and they satisfy the condition: f1/f=0.8.

In the seventh embodiment of the present optical lens system, a focal length of the third lens element 730 is f3, the focal length of the optical lens system is f, and they satisfy the condition: f3/f=2.30.

In the seventh embodiment of the present optical lens system, a distance between the object-side surface 751 and the image-side surface 752 of the fifth lens element 750 along an optical axis 791 is D9, a distance between the object-side surface 741 and the image-side surface 742 of the fourth lens element 740 along the optical axis 791 is D7, the focal length of the optical lens system is f, and they satisfy the condition: (D9−D7)×10/f=0.53.

table 14, wherein the units of the radius of curvature, the thickness and the focal length in table 13 are expressed in mm, and in table 14, k represents the conic constant, and $A_4$, $A_6$, $A_8$, $A_{10}$, $A_{12}$, $A_{14}$ . . . : represent the high-order aspheric coefficients. In the tables 13 and 14, the surfaces 1 and 2 represent the object-side surface 711 and the image-side surface 712 of the first lens element 710, respectively, the surfaces 3 and 4 represent the object-side surface 721 and the image-side surface 722 of the second lens element 720, respectively, the surfaces 5 and 6 represent the object-side surface 731 and the image-side surface 732 of the third lens element 730, respectively, the surfaces 7 and 8 represent the object-side surface 741 and the image-side surface 742 of the fourth lens element 740, respectively, and the surfaces 9 and 10 represent the object-side surface 751 and the image-side surface 752 of the fifth lens element 750, respectively.

TABLE 13

(Embodiment 7)
f (focal length) = 2.05 mm, Fno = 2.0, HFOV = 39.9 deg.

| Surface # | | Curvature Radius | Thickness | Material | index | Abbe | Focal length |
|---|---|---|---|---|---|---|---|
| 0 | Object | Infinity | Infinity | | | | |
| 1(stop) | Lens 1 | 1.89 (ASP) | 0.51 | Plastic | 1.544 | 55.9 | 2.84 |
| 2 | | −7.71 (ASP) | 0.08 | | | | |
| 3 | Lens 2 | 6.47 (ASP) | 0.25 | Plastic | 1.632 | 23.4 | −3.90 |
| 4 | | 1.76 (ASP) | 0.29 | | | | |
| 5 | Lens 3 | 4.42 (ASP) | 0.45 | Plastic | 1.544 | 55.9 | 8.12 |
| 6 | | Infinity | 0.45 | | | | |
| 7 | Lens 4 | −2.19 (ASP) | 0.56 | Plastic | 1.535 | 55.5 | 2.24 |
| 8 | | −0.84 (ASP) | 0.03 | | | | |
| 9 | Lens 5 | −40.00 (ASP) | 0.75 | Plastic | 1.515 | 55.5 | −1.98 |
| 10 | | 1.09 (ASP) | 0.29 | | | | |
| 11 | IR-filter | Infinity | 0.21 | Glass | 1.517 | 64.2 | — |
| 12 | | Infinity | 0.69 | | | | |
| 13 | Image | Infinity | — | | | | |

In the seventh embodiment of the present optical lens system, a radius of curvature of the object-side surface 741 of the fourth lens element 740 is R7, a radius of curvature of the image-side surface 742 of the fourth lens element 740 is R8, and they satisfy the condition: (R7−R8)/(R7+R8)=0.44.

In the seventh embodiment of the present optical lens system, a radius of curvature of the object-side surface 751 of the fifth lens element 750 is R9, the focal length of the optical lens system is f, and they satisfy the condition: |R9|/f=11.33.

In the seventh embodiment of the present optical lens system, a focal length of the second lens element 720 is f2, the focal length of the optical lens system is f, and they satisfy the condition: f2/f=−1.10.

In the seventh embodiment of the present optical lens system, a refraction index of the second lens element 720 is Nd2, and an Abbe number of the second lens element 720 is Vd2, and they satisfy the conditions: Nd2=1.632; Vd2=23.40.

In the seventh embodiment of the present optical lens system, a refraction index of the third lens element 730 is Nd3, and an Abbe number of the third lens element 730 is Vd3, and they satisfy the conditions: Nd3=1.544; Vd3=55.90.

In the seventh embodiment of the present optical lens system, a distance from the object-side surface 711 of the first lens element 710 to the image plane 790 along the optical axis 791 is TL, and a half of the maximum image height of the present optical lens system is ImgH, and they satisfy the condition: TL/ImgH=1.52.

The detailed optical data of the seventh embodiment is shown in table 13, and the aspheric surface data is shown in

TABLE 14

Aspheric Coefficients

| Surface # | 1 | 2 | 3 | 4 | 5 |
|---|---|---|---|---|---|
| k = | −3.05E+00 | −4.00E+01 | 8.38E+00 | −7.66E+00 | 6.89E+00 |
| A4 = | 4.08E−02 | 5.39E−02 | −3.40E−02 | 3.14E−02 | −8.06E−02 |
| A6 = | 1.2E−02 | −3.93E−02 | 1.03E−01 | 6.96E−02 | 1.78E−02 |
| A8 = | −6.61E−02 | −1.35E−02 | −9.86E−02 | −5.75E−02 | −3.33E−02 |
| A10 = | 6.53E−02 | −4.49E−03 | −2.84E−02 | −1.01E−03 | 5.14E−02 |
| A12 = | −3.11E−02 | 1.65E−03 | 5.81E−02 | 1.46E−02 | 1.06E−02 |
| A14 = | −4.25E−03 | 4.12E−03 | −5.47E−03 | −2.65E−04 | −1.33E−02 |
| A16 = | | | | | |
| A18 = | | | | | |

| Surface # | 6 | 7 | 8 | 9 | 10 |
|---|---|---|---|---|---|
| k = | 0.00E+00 | 2.16E+00 | −3.11E+00 | −3.41E+01 | −7.64E+00 |
| A4 = | −3.66E−02 | 3.89E−02 | −9.39E−02 | −4.88E−02 | −6.44E−02 |
| A6 = | −1.16E−02 | 4.08E−02 | 7.46E−02 | −5.01E−02 | 2.40E−02 |
| A8 = | −2.28E−02 | −1.94E−02 | −1.04E−02 | 6.36E−03 | −7.99E−03 |
| A10 = | −1.20E−02 | −1.72E−03 | 4.06E−04 | 2.52E−04 | 1.47E−03 |
| A12 = | 2.64E−02 | 2.26E−03 | 5.09E−04 | −1.19E−03 | −8.83E−05 |
| A14 = | 1.06E−03 | −3.62E−03 | −2.80E−04 | 5.18E−05 | −2.59E−05 |
| A16 = | | 4.74E−03 | −7.95E−05 | 1.49E−04 | 5.92E−06 |
| A18 = | | | | −2.74E−05 | −3.88E−07 |

It is to be noted that the tables 1-14 show different data from the different embodiments, however, the data of the different embodiments are obtained from experiments. Therefore, any product of the same structure is deemed to be within the scope of the present invention even if it uses different data. Table 15 lists the relevant data for the various embodiments of the present invention.

|  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| f | 3.54 | 3.63 | 3.56 | 3.70 | 3.70 | 3.57 | 3.53 |
| Fno | 2.05 | 2.4 | 2.05 | 2.05 | 2.0 | 2.2 | 2.05 |
| HFOV | 39 | 39.4 | 39.06 | 38.6 | 38.4 | 39.6 | 39.9 |
| FOV | 78 | 78.8 | 79.2 | 77.2 | 76.8 | 79.2 | 79.8 |
| f4/f | 0.62 | 0.61 | 0.65 | 0.82 | 0.75 | 0.79 | 0.63 |
| f5/f | −0.53 | −0.54 | −0.55 | −0.63 | −0.61 | −0.61 | −0.56 |
| f1/f | 0.82 | 0.85 | 0.82 | 0.77 | 0.71 | 0.78 | 0.80 |
| f2/f | −1.09 | −1.27 | −1.08 | −1.01 | −1.09 | −1.08 | −1.10 |
| f3/f | 1.93 | 2.41 | 1.91 | 1.90 | 3.23 | 1.89 | 2.30 |
| (D9 − D7) × 10/f | 0.41 | 0.43 | 0.20 | 0.20 | 0.42 | 0.85 | 0.53 |
| (R7 − R8)/(R7 + R8) | 0.45 | 0.39 | 0.43 | 0.36 | 0.38 | 0.35 | 0.44 |
| |R9|/f | 11.30 | 4.32 | 11.24 | 7.37 | 13.51 | 14.01 | 11.33 |
| Nd2 | 1.632 | 1.632 | 1.632 | 1.632 | 1.632 | 1.632 | 1.632 |
| Vd2 | 23.40 | 23.40 | 23.40 | 23.40 | 23.40 | 23.40 | 23.40 |
| Nd3 | 1.544 | 1.515 | 1.544 | 1.544 | 1.544 | 1.544 | 1.544 |
| Vd3 | 55.90 | 57.20 | 55.90 | 55.90 | 55.90 | 55.90 | 55.90 |
| TL/ImgH | 1.58 | 1.57 | 1.52 | 1.52 | 1.52 | 1.49 | 1.52 |

In the present optical lens system, the respective lens elements can be made of glass or plastic. It can effectively reduce manufacturing cost if the lens elements are made of plastic.

While we have shown and described various embodiments in accordance with the present invention, it is clear to those skilled in the art that further embodiments may be made without departing from the scope of the present invention.

What is claimed is:

1. An optical lens system comprising, in order from an object side to an image side:

a stop;

a first lens element with a positive refractive power having an aspheric convex object-side surface and an aspheric convex image-side surface;

a second lens element with a negative refractive power having a meniscus shape, and a concave image-side surface, at least one of an object-side surface or the image-side surface of the second lens element being aspheric;

a third lens element with a positive refractive power having a convex object-side surface and an image-side surface, and the image-side surface being convex or flat near an optical axis, both of the object-side surface and the image-side surface are aspheric;

a fourth lens element with a positive refractive power having concave object-side surface and a convex image-side surface, at least one of the object-side surface or the image-side surface of the fourth lens element being aspheric;

a fifth lens element with a negative refractive power having an aspheric object-side surface and an aspheric image-side surface, the image-side surface of the fifth lens element being concave near the optical axis, and at least one inflection point being formed on the image-side surface of the fifth lens element;

wherein a focal length of the optical lens system is f, a focal length of the first lens element is f1, a focal length of the third lens element is f3, a focal length of the fourth lens element is f4, a focal length of the fifth lens element is f5, and they satisfy the conditions:

$0.4 < f4/f < 1.0$;

$-0.8 < f5/f < -0.4$;

$f1/f < 1.2 < f3/f$.

2. The optical lens system as claimed in claim 1, wherein a distance between the object-side surface and the image-side surface of the fifth lens element along an optical axis is D9, a distance between the object-side surface and the image-side surface of the fourth lens element along the optical axis is D7, the focal length of the optical lens system is f, and they satisfy the condition:

$0.1 < (D9 - D7) \times 10/f < 1.0$.

3. The optical lens system as claimed in claim 1, wherein a radius of curvature of the object-side surface of the fourth lens element is R7, a radius of curvature of the image-side surface of the fourth lens element is R8, and they satisfy the condition:

$0.2 < (R7 - R8)/(R7 + R8) < 0.7$.

4. The optical lens system as claimed in claim 1, wherein a radius of curvature of the object-side surface of the fifth lens element is R9, the focal length of the optical lens system is f, and they satisfy the condition: $|R9|/f > 4$.

5. The optical lens system as claimed in claim 1, wherein a focal length of the second lens element is f2, the focal length of the optical lens system is f, and they satisfy the condition:

$-1.4 < f2/f < -0.85$.

6. The optical lens system as claimed in claim 5, wherein a refraction index of the second lens element is Nd2, and an Abbe number of the second lens element is Vd2, and they satisfy the conditions:

$Nd2 > 1.57$;

$Vd2 < 28$.

7. The optical lens system as claimed in claim 6, wherein a refraction index of the third lens element is Nd3, and an Abbe number of the third lens element is Vd3, and they satisfy the conditions:

$Nd3 < 1.6$;

$Vd3 > 30$.

8. The optical lens system as claimed in claim 1, wherein a distance from the object-side surface of the first lens element to the image plane along the optical axis is TL, a half of the maximum image height of the optical lens system is ImgH, and they satisfy the condition:

$TL/ImgH < 1.7$.

9. The optical lens system as claimed in claim 8, wherein a maximum angle of field of view of the optical lens system is FOV, and FOV>73 degrees.

* * * * *